(12) United States Patent
Amagai et al.

(10) Patent No.: US 8,771,863 B2
(45) Date of Patent: Jul. 8, 2014

(54) BATTERY MODULE AND MANUFACTURING METHOD OF BATTERY MODULE

(75) Inventors: Ryuichi Amagai, Isehara (JP); Naoki Aizawa, Machida (JP); Naoto Todoroki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 377 days.

(21) Appl. No.: 12/919,969

(22) PCT Filed: Feb. 25, 2009

(86) PCT No.: PCT/JP2009/053406
§ 371 (c)(1),
(2), (4) Date: Aug. 27, 2010

(87) PCT Pub. No.: WO2009/107657
PCT Pub. Date: Sep. 3, 2009

(65) Prior Publication Data
US 2011/0014512 A1 Jan. 20, 2011

(30) Foreign Application Priority Data

Feb. 29, 2008 (JP) .................. 2008-049930
Dec. 18, 2008 (JP) .................. 2008-322830

(51) Int. Cl.
| | | |
|---|---|---|
| *H01M 6/42* | (2006.01) | |
| *H01M 6/12* | (2006.01) | |
| *H01M 6/46* | (2006.01) | |
| *H01M 2/30* | (2006.01) | |
| *H01M 10/04* | (2006.01) | |
| *H01M 2/26* | (2006.01) | |
| *H01M 10/0585* | (2010.01) | |
| *H01M 2/10* | (2006.01) | |
| *H01M 2/02* | (2006.01) | |
| *H01M 2/18* | (2006.01) | |
| *H01M 10/48* | (2006.01) | |
| *H01M 2/20* | (2006.01) | |
| *H01M 2/04* | (2006.01) | |
| *H01M 2/06* | (2006.01) | |

(52) U.S. Cl.
CPC .............. *H01M 2/1077* (2013.01); *H01M 2/30* (2013.01); *H01M 10/0413* (2013.01); *H01M 6/46* (2013.01); *H01M 2/266* (2013.01); *H01M 10/0585* (2013.01); *Y02E 60/12* (2013.01); *H01M 2/1072* (2013.01); *H01M 2/0217* (2013.01); *H01M 2/18* (2013.01); *H01M 10/48* (2013.01); *H01M 2/206* (2013.01); *H01M 2/06* (2013.01); *H01M 2/04* (2013.01); *H01M 2/0245* (2013.01)
USPC ........................................... 429/159; 429/162

(58) Field of Classification Search
CPC ......................................................... H01M 6/42
USPC .......... 429/130, 162, 211, 175, 179, 182, 163, 429/178, 180, 149–160, 65, 121; 29/623.1
IPC .......................................... H01M 02/02, 02/021
See application file for complete search history.

(56) References Cited

U.S. PATENT DOCUMENTS

| | | | |
|---|---|---|---|
| 4,693,948 A * | 9/1987 | McEwan ........................ 429/121 |
| 5,487,958 A | 1/1996 | Tura | |
| 2005/0140338 A1 | 6/2005 | Kim et al. | |
| 2006/0088761 A1 | 4/2006 | Ota et al. | |
| 2007/0141457 A1 * | 6/2007 | Amagai ......................... 429/152 |

FOREIGN PATENT DOCUMENTS

| | | |
|---|---|---|
| CN | 1767229 A | 5/2006 |
| CN | 1988215 A | 6/2007 |
| EP | 1 798 787 A2 | 6/2007 |
| EP | 1 936 717 A1 | 6/2008 |
| JP | 2006-210312 A | 8/2006 |
| JP | 2007-172893 A | 7/2007 |

\* cited by examiner

*Primary Examiner* — Patrick Ryan
*Assistant Examiner* — Kiran Quraishi
(74) *Attorney, Agent, or Firm* — Foley & Lardner LLP

(57) ABSTRACT

Provided is a battery module in which a stacked body (142) of a plurality of flat batteries (144A to 144D) stacked on one another is housed. The battery module includes the flat batteries, an output terminal, a metal container, insulating plates and an insulating cover (170). Each of the flat batteries (144A to 144D) includes a power-generating element, an exterior package member for sealing the power-generating element, and electrode terminals led out from the exterior package member. The output terminal is used to provide a parallel or series connection between the electrode terminals of the plurality of flat batteries (144A to 144D) and to output power therefrom. The metal container is used to house the stacked body. The insulating plates are disposed to hold the electrode terminals of the flat batteries (144A to 144D) therebetween in such a way to insulate the electrode terminals from one another, and also include window portions through which the electrode terminals are exposed for the connection. The insulating cover (170) is disposed in such a way to cover the window portions of the insulating plates (160A, 160E) located in the outermost layers.

14 Claims, 24 Drawing Sheets

BATTERY MODULE AND MANUFACTURING METHOD OF BATTERY MODULE

TECHNICAL FIELD

The present invention relates to a battery module and a manufacturing method of the battery module.

BACKGROUND ART

Japanese Patent Application Publication No. 2007-172893 discloses a battery module having a high output and/or a high capacity which are achieved by stacking multiple flat batteries including electrode terminals led out from an exterior package member, and electrically connecting the flat batteries in series and/or in parallel.

SUMMARY OF INVENTION

Technical Problem

However, electrode terminals of each flat battery are sandwiched from their upper and lower sides between insulating plates having window portions for operation. The window portions are used for an electrical connection between the electrode terminals and output terminals or between the electrode terminals. When such stacked body is housed in a metal container, the window portions of the insulating plates located in the outermost layers come to face the inner face of the metal container for housing the flat batteries. There are nothing but air gaps between the electrode terminals exposed from the window portions and the inner face of the metal container. Thus, in order to prevent short circuits between the electrode terminals and the metal container, the insulation properties of the inner face of the metal container need to be increased. There is therefore a problem of increasing the manufacturing cost.

The present invention has been made to solve the problem related the above-described conventional technique, and has an object to provide a battery module capable of preventing short circuits between its electrode terminals and metal container while suppressing an increase in manufacturing cost, as well as a manufacturing method of the battery module.

Solution to Problem

An aspect of the present invention for achieving the above-described object is a battery module in which a stacked body of multiple flat batteries stacked on one another is housed. The battery module includes the flat batteries, an output terminal, a metal container, insulating plates and an insulating cover. Each flat battery includes a power-generating element, an exterior package member for sealing the power-generating element, and electrode terminals led out from the exterior package member. The output terminal is used to provide a parallel or series connection between the electrode terminals of the multiple flat batteries, and to output power therefrom. The metal container is used to house the stacked body. The insulating plates are disposed to hold the electrode terminals of each of the flat batteries therebetween in such a way to insulate the electrode terminals from one another, and include window portions through which the electrode terminals are exposed for the connection. The insulating cover is disposed in such a way to cover the window portions of the insulating plates located respectively in outermost layers.

Another aspect of the present invention for achieving the above-described object is a method of manufacturing a battery module in which a stacked body of multiple flat batteries stacked on one another is housed. The manufacturing method includes: a stacked body forming step; an output terminal forming step; an insulating cover fitting step; and a metal container housing step. In the stacked body forming step, multiple flat batteries and insulating plates are stacked on one another to form a stacked body of the flat batteries. In this respect, the flat batteries each includes: a power-generating element; an exterior package member for sealing the power-generating element; and electrode terminals led out from the exterior package member. The insulating plates include window portions through which the electrode terminals are exposed, and are disposed to hold the electrode terminals of the flat batteries therebetween in such a way to insulate the electrode terminals from one another. In the output terminal forming step, the electrode terminals exposed through the window portions are joined together to thereby form an output terminal. In the insulating cover fitting step, the insulating cover is fitted to the insulating plates in such a way that the insulating cover covers the window portions of the insulating plates located in the outermost layers in a direction of the stacking. In the metal container housing step, the stacked body with the insulating cover fitted thereto is housed in a metal container.

DESCRIPTION OF EMBODIMENTS

Figure 1:
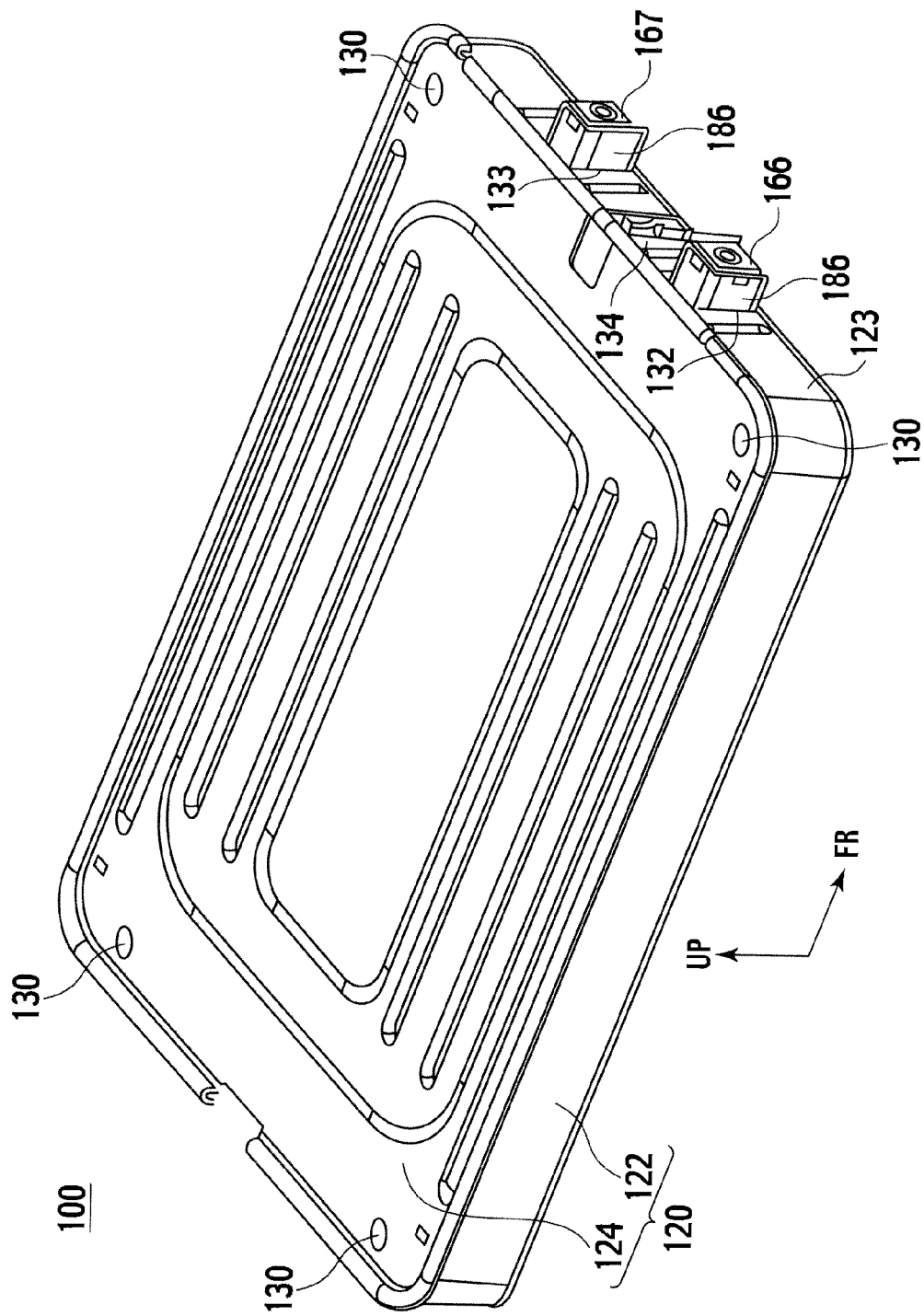
FIG. 1 is a perspective view for explaining a battery module according to Embodiment 1.

Hereinafter, embodiments of the present invention will be described by referring to the drawings. Note that in the drawings, UP represents upward in a stacking direction of flat batteries constituting a cell unit of a battery module, and FR represents frontward of the battery module.

Figure 2:
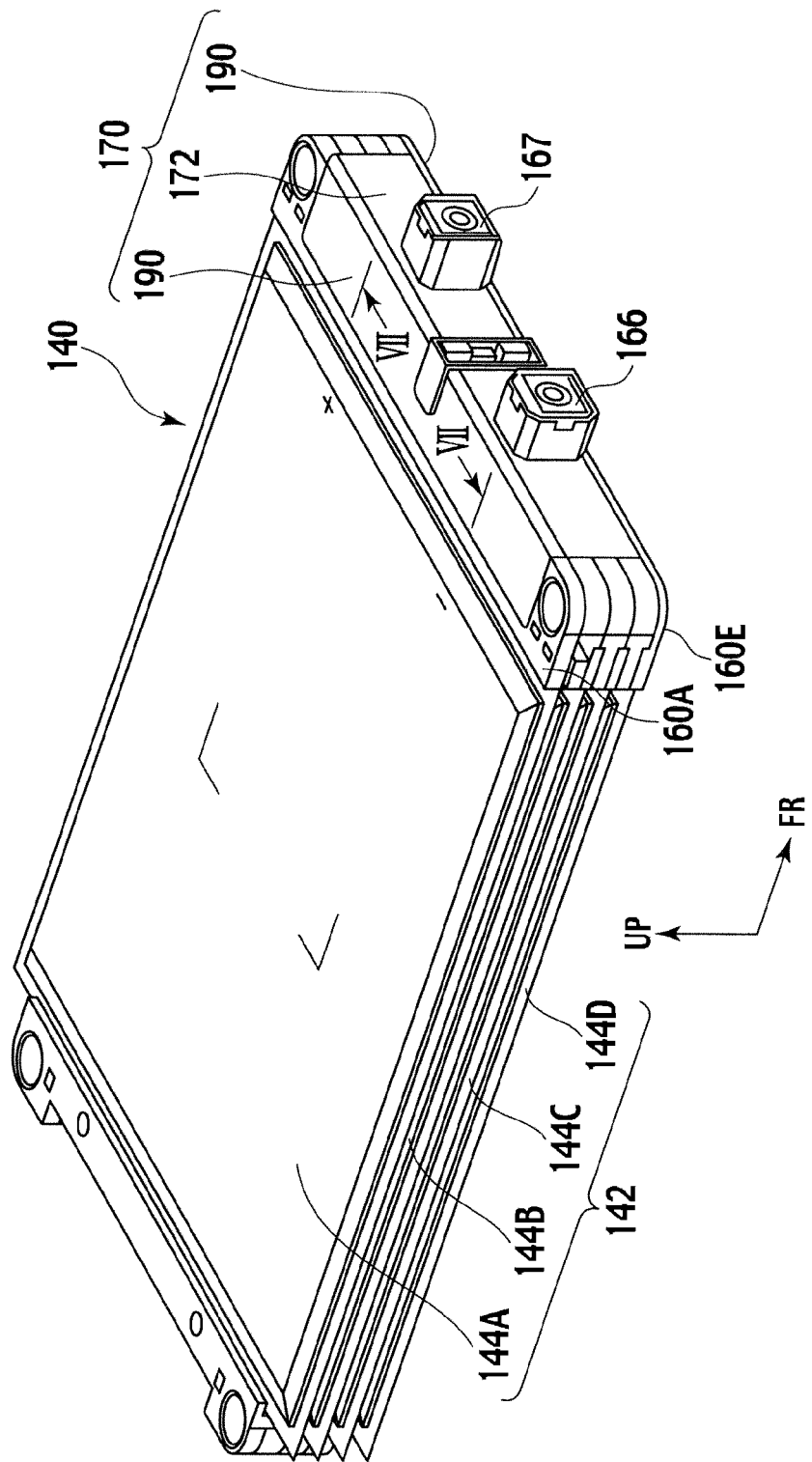
FIG. 2 is a perspective view for explaining a cell unit inside a case shown in FIG. 1

As illustrated in FIG. 1, a battery module 100 according to Embodiment 1 includes a case (metal container) 120. As illustrated in FIG. 2, the battery module 100 includes, inside the case 120, a cell unit 140 and an insulating cover 170 which has electrical insulation properties. The battery module 100 may be used singly, yet multiple battery modules 100 can be connected in series and/or in parallel to form a battery assembly corresponding to a desired current, voltage and capacity, for example. Note that, as will be described later, the insulating cover 170 prevents a short circuit between the cell unit 140 and the case 120, whereby the insulation properties of the inner face of the case 120 need not be increased and an increase in manufacturing cost is therefore suppressed.

Returning to FIG. 1, the case 120 is used to house the cell unit 140, and includes a lower case 122 formed in a substantially rectangular box shape and an upper case 124 serving as a lid of the lower case 122. An edge portion of the upper case 124 is bent around and clamped on to an edge portion of a peripheral wall of the lower case 122 by swaging. The lower case 122 and the upper case 124 are each formed of a relatively thin steel or aluminum plate, on which press working is performed to secure the strength and to provide a certain shape for holding the cell unit 140.

The lower case 122 and the upper case 124 each include though-holes 130. The through-holes 130 are disposed in four locations at corners of each of the lower case 122 and the upper case 124. The through-holes 130 are used as holes through which to insert through-bolts (not shown) for holding a battery assembly of multiple battery modules 100 stacked on one another. The lower case 122 also includes opening portions 132, 133 and 134 formed in a lateral wall portion of a front face 123 thereof.

As illustrated in FIG. 2, the cell unit 140 includes: a stacked body 142 of multiple flat batteries 144 (144A to 144D) stacked on and electrically connected to one another; and multiple spacers (insulating plates) 160 and 161 having electrical insulation properties.

Figure 7:
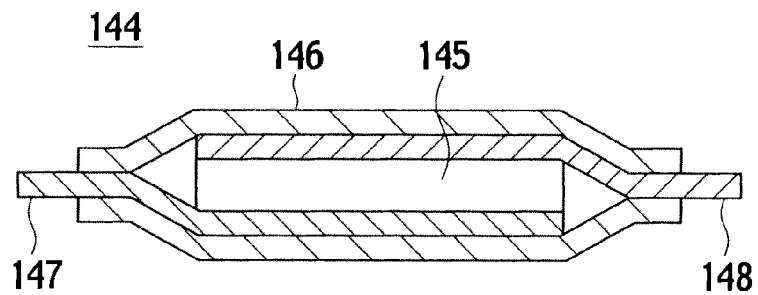
FIG. 7 is a cross-sectional view for explaining one of flat batteries constituting the stacked body shown in FIG. 2, the cross sectional view taken along the VII-VII line of FIG. 2.

Each flat battery 144 is, for example, a lithium-ion secondary battery, and includes, as illustrated in FIG. 7, an power-generating element 145, an exterior package member 146 for sealing the power-generating element 145, and tabs (electrode terminals) 147 and 148 led out from the exterior package member.

The power-generating element 145 is formed by sequentially stacking a cathode plate, an anode plate, and a separator. The cathode plate includes a cathode active material layer made of a lithium-transition metal complex oxide such as $LiMn_2O_4$, for example. The anode plate includes an anode active material layer made of carbon and a lithium-transition metal complex oxide, for example. The separator is formed of porous PE (polyethylene) which an electrolyte and air can permeate, for example.

From the viewpoint of weight saving and thermal conductivity, the exterior package member 146 is formed of a sheet material such as a polymer-metal complex laminate film obtained by coating a metal, such as aluminum, stainless steel, nickel or copper (including an alloy thereof), with an insulating body such as a polypropylene film, and outer peripheral portions of the exterior package member 146 are joined to each other partly or entirely by heating adhesion.

The tabs 147 and 148 are members to draw a current from the power-generating element 145, and both extend frontward from the front face side of the flat battery 144.

Figure 5:
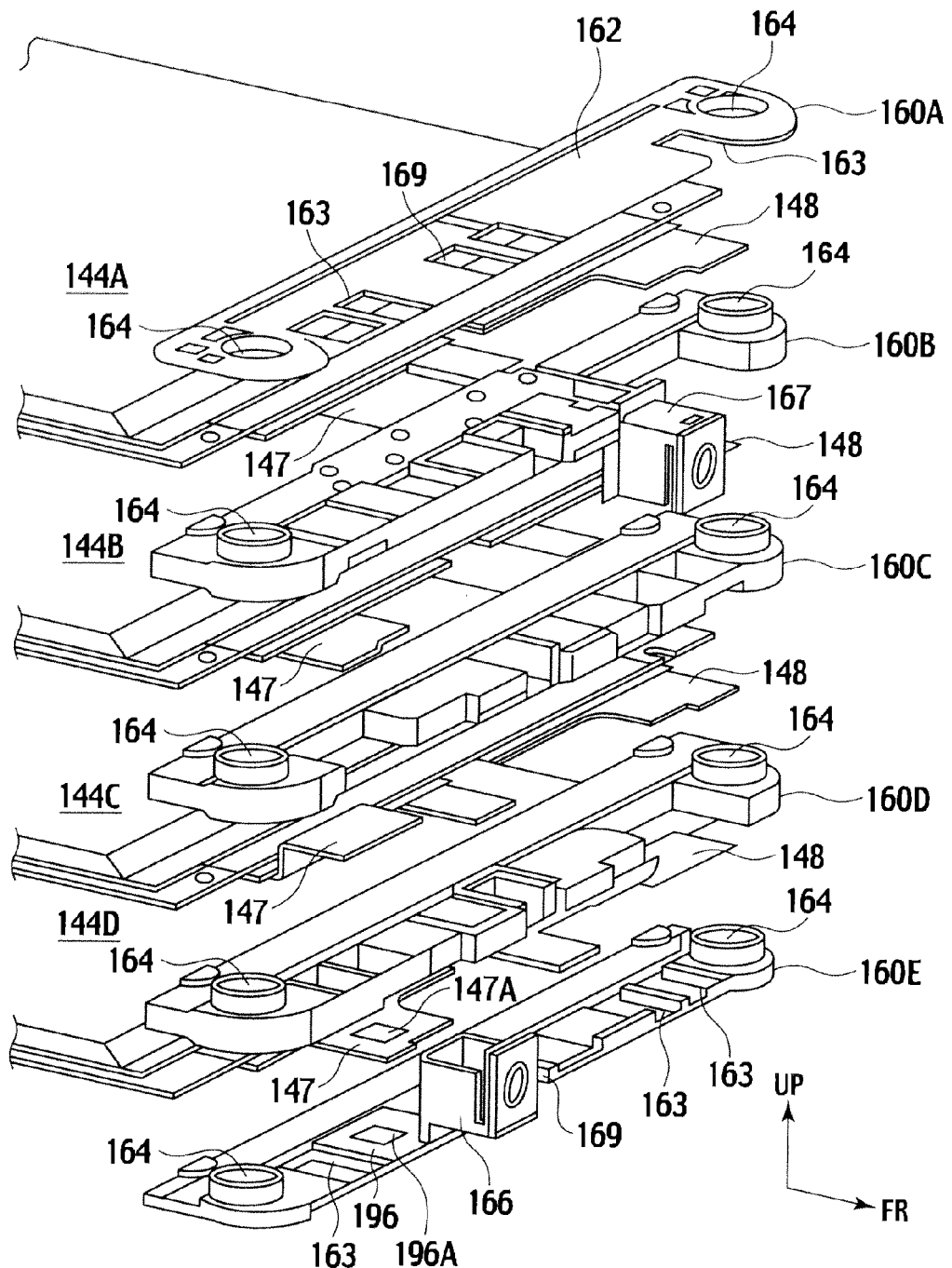
FIG. 5 is an exploded perspective view for explaining the front face side of the stacked body shown in FIG. 2.

FIG. 5 shows an exploded view of the multiple electrically insulating spacers (insulating plates) 160 illustrated in FIG. 2. The spacers 160 (160A to 160E) are disposed on the front face side of the stacked body 142, and positioned to hold the tabs 147 and 148 of the flat batteries 144 therebetween. The spacers 160 include window portions 163, through-holes 164 and voltage detecting portions 169.

The window portions 163 are used to electrically connect the flat batteries 144 together, and to partly expose the tabs 147 or 148 therethrough.

The through-holes 164 are disposed in two corners, and aligned with the through-holes 130 of the aforementioned lower case 122 and upper case 124 on the front face side. The through-holes 164 are used as holes through which to insert the through-bolts.

The voltage detecting portions 169 are formed as notches which partly expose the peripheries of the tabs 147 or 148 held therebetween, and are used to detect the voltages of the flat batteries 140. The voltage detection is performed to manage charge and discharge of the battery module 100. The voltage detecting portions 169 are positioned in such a way to face the opening portion 134 formed in the lateral wall portion of the front face 123 of the lower case 122, and can be exposed to the outside through the opening portion 134. Note that the voltage detecting portions 169 may be formed from exclusive terminals.

A recessed portion 162 to which to attach the insulating cover 170 is provided to an upper face of the uppermost spacer 160A (one outermost layer) and also to a lower face of the lowermost spacer 160E (the other outermost layer). The spacer 160B located immediately below the spacer 160A includes an output terminal 167 electrically joined to the tab 147. The spacer 160E includes an output terminal 166 electrically joined to the tab 147 through a bus bar 196. The output terminals 166 and 167 are disposed in such a way to project respectively from the opening portions 132 and 133 formed in the lateral wall portion of the front face 123 of the lower case 122. Note that reference numerals 147A and 196A denote joining portions of the tab 147 and the bus bar 196, respectively.

Figure 6:
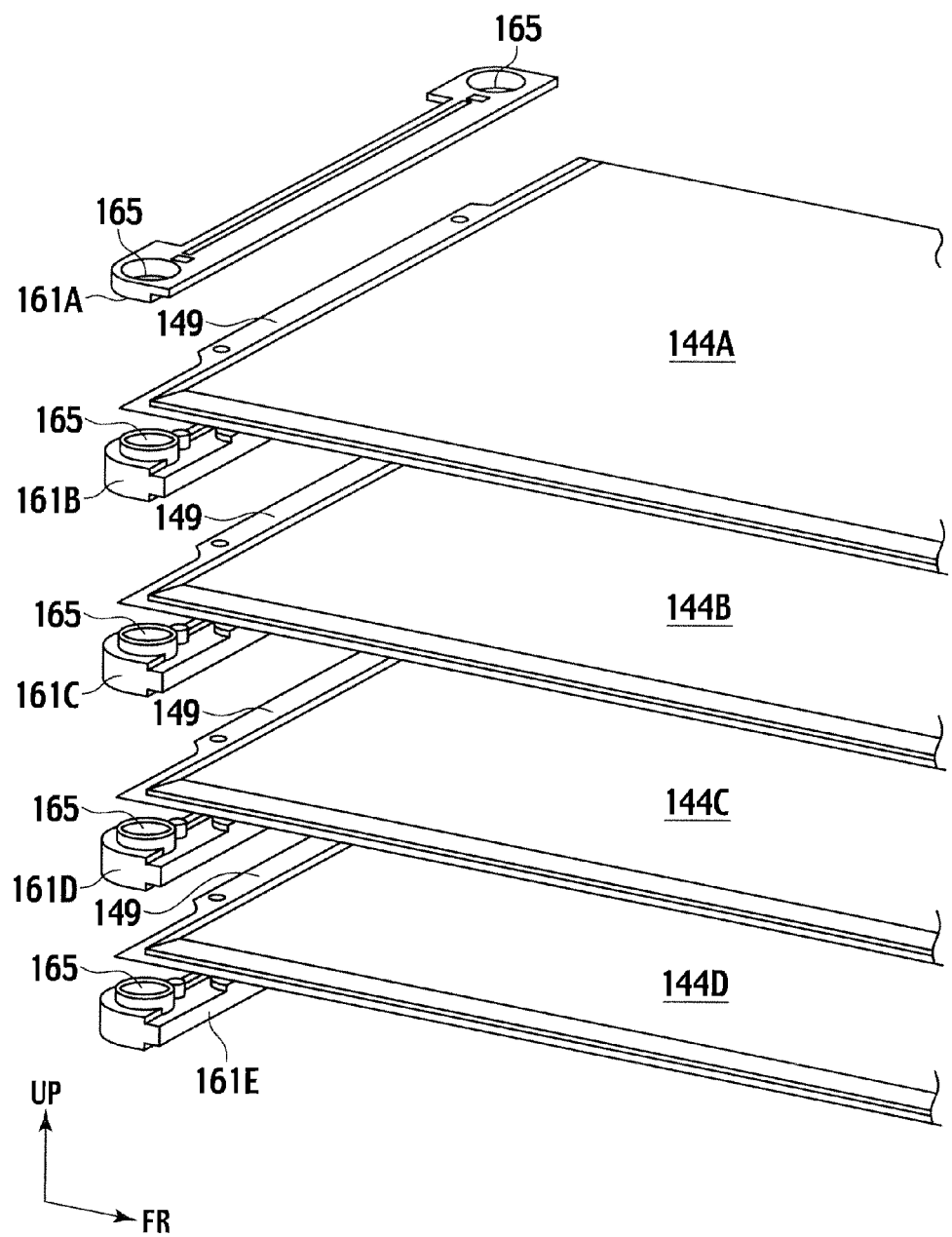
FIG. 6 is an exploded perspective view for explaining a back side of the stacked body shown in FIG. 2.

FIG. 6 shows an exploded view of the electrically insulating multiple spacers (insulating plates) 161 illustrated in FIG. 2. The spacers 161 (161A to 161E) are disposed on the rear side of the stacked body 142, and positioned in such a way to sandwich rear extended portions 149 of the flat batteries 144. The spacers 161 include through-holes 165. The through holes 165 are disposed in two corners, and aligned with the through-holes 130 of the lower case 122 and upper case 124 on the rear side. The through-holes 165 are used as holes through which to insert the through-bolts.

The insulating cover 170 will be described next.

Figure 3:
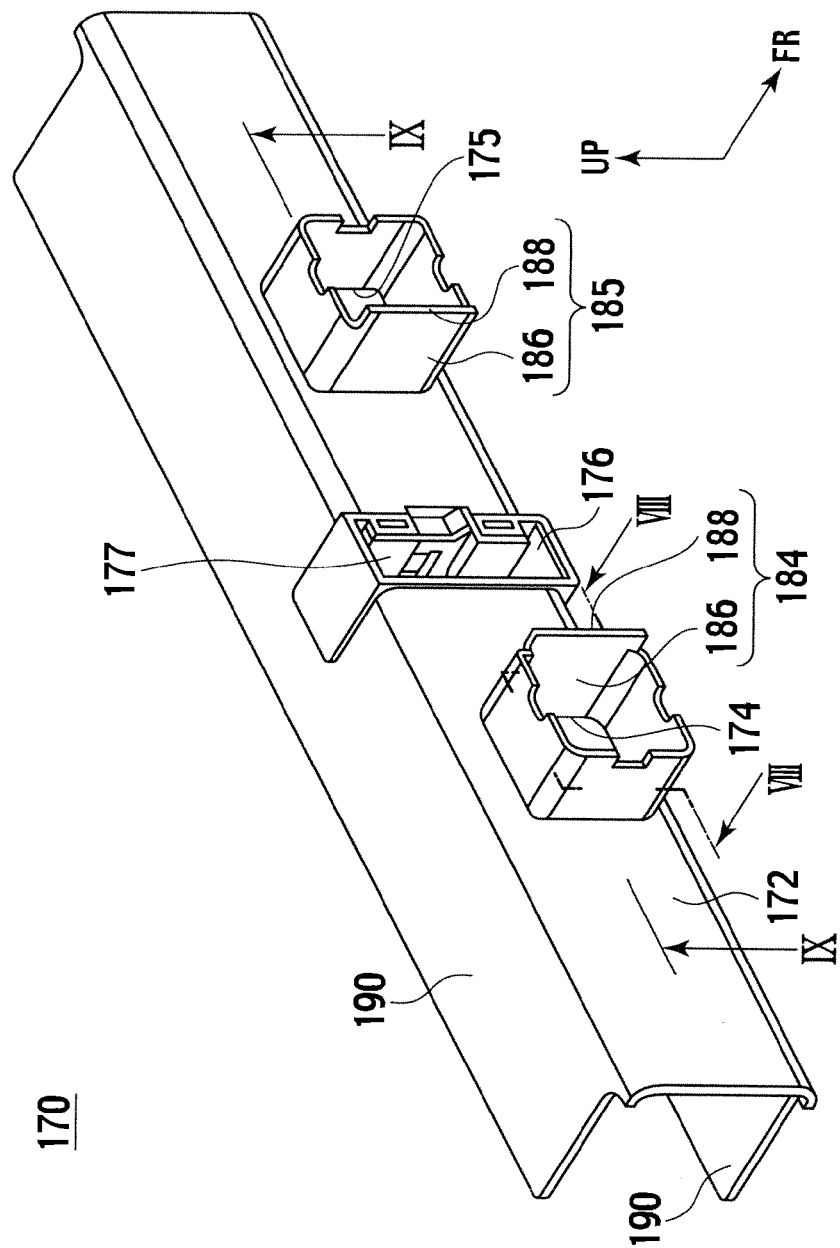
FIG. 3 is a perspective view for explaining an insulating cover shown in FIG. 2.

As shown in FIG. 3, the insulating cover 170 has a substantially U cross-sectional shape in its cross section taken in a direction orthogonal to the width direction of the battery module 100. The insulating cover 170 includes a main-body base portion 172 located on the front face side of the battery module 100, and upper and lower side face portions 190 extending almost orthogonally respectively from both upper and lower edges of the main-body base portion 172 toward the rear side of the battery module 100. Thus, the insulating cover 170 is configured to sandwich the cell unit 140 with the upper and lower side face portions 190.

The main-body base portion 172 is disposed in such a way to face the front face side of the cell unit 140 shown in FIG. 2, and includes opening portions 174 and 175 located on lateral sides and an insertion opening 176 located in the middle therebetween.

The opening portions 174 and 175 are aligned with the output terminals 166 and 167, and also formed in such shapes that the output terminals 166 and 167 can project frontward. The opening portions 174 and 175 include, at their edges, projecting portions 184 and 185 extending outward, respectively. The projecting portions 184 and 185 are made such that they can project respectively from the opening portions 132 and 133 in the front face 123 of the lower case 122 shown in FIG. 1. In addition, the projecting portions 184 and 185 include tubular wall portions 186, and extended portions 188 disposed at the lead ends of their tubular wall portions 186, respectively.

Figure 8:
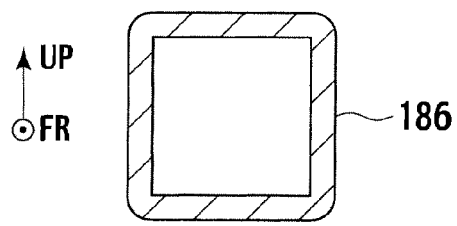
FIG. 8 is a cross-sectional view for each lateral wall portion of the insulating cover shown in FIG. 3, the cross sectional view taken along the VIII-VIII line of FIG. 3.

As shown in FIG. 8, the tubular wall portions 186 have substantially rectangular cross-sectional shapes corresponding to the outer peripheral shapes of the output terminals 166 and 167, respectively. For this reason, when the insulating cover 170 is mounted to the cell unit 140 and housed in the case 120, the tubular wall portions 186 with such simple structures function as terminal guides that surround the peripheries of the respective output terminals 166 and 167 having been exposed to the outside and thereby hold the output terminals 166 and 167.

This makes it possible to reduce loads on joining portions of the output terminal 166 and 167 and the spacers 160 when an external force is applied to the output terminals 166 and 167. Also, since the tubular wall portions 186 have noncircular cross-sectional shapes, the tubular wall portions 186 can be used as rotation preventing means at the time of bolting the output terminals 166 and 167. This relaxes stresses applied to the output terminals 166 and 167, making it possible to reduce loads on the joining portions of the output terminals 166 and 167, and the spacers 160. Moreover, since the tubular wall portions 186 are integral with the insulating cover 170 (main-body base portion 172), the number of components is reduced, whereby the manufacturing cost can be reduced.

The extended portions 188 are configured to extend frontward respectively to positions beyond the lead ends of the output terminals 166 and 167 (i.e., where connections to the output terminals 166 and 167 take place) after the insulating cover 170 is mounted to the cell unit 140 and housed in the case 120. The extended portions 188 hinder contact of the lead ends of the output terminals 166 and 167 with an electrical conductor present outside, hence making it possible to suppress occurrence of a short circuit.

The insertion opening 176 is an opening portion to which to insert a connector (voltage detecting connector) for detection of the voltages of the flat batteries 144, and is disposed in such a way to expose therethrough the voltage detecting portions 169 of the spacers 160 (160A to 160E) shown in FIG. 5. Also, a guide member 177 extending inward is disposed on an edge portion of the insertion opening 176. The guide member 177 is a connector guide to guide insertion and removal of the connector. Since the guide member 177 is integral with the insulating cover 170 (main-body base portion 172), the number of components is reduced, whereby the manufacturing cost can be reduced.

Figure 9:
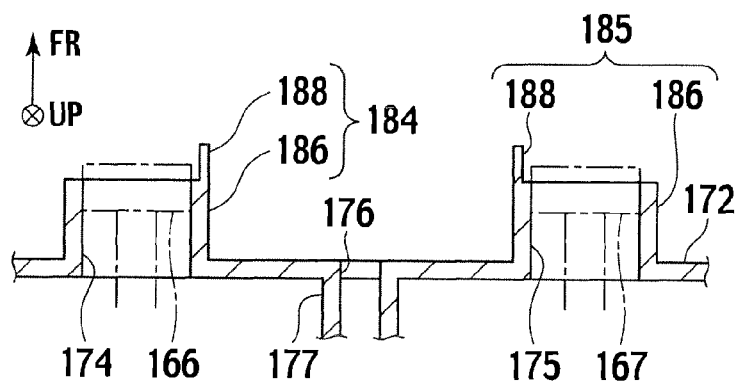
FIG. 9 is a cross-sectional view for explaining an extended portion disposed in the lead end of each lateral wall portion shown in FIG. 8, the cross-sectional view taken along the IX-IX line of FIG. 3.

As shown in FIG. 9, the extended portions 188 of the tubular wall portions 186 are positioned in such a way to face the insertion opening 176 located in the middle therebetween. Because the voltage detecting connector is inserted into the insertion opening 176, cables of connectors for the respective output terminals 166 and 167 are disposed on lateral sides so as to avoid interference with a cable of the voltage detecting connector. Accordingly, the extended portions 188 of the tubular wall portions 186 do not come to be obstacles to the cables of the connectors for the output terminals 166 and 167.

The upper and lower side face portions 190 are disposed on the recessed portion 162 in the upper surface of the uppermost spacer 160A, and on the recessed portion 162 in the lower surface of the lowermost spacer 160E, respectively, meaning that the upper and lower side face portions 190 are configured to cover the window portions 163 of the spacers 160A and 160E. Specifically, the spacers 160A and 160E and the insulating cover 170 are interposed between the inner face of the case 120 (the lower case 122 and the upper case 124) and the tabs 147, 148 exposed from the window portions 163, whereby short circuits between the tabs 147 and 148 and the case 120 are prevented. Thus, the insulation properties of the inner face of the case 120 need not be increased, and an increase in manufacturing cost is therefore suppressed.

A manufacturing method of the battery module according to Embodiment 1 will be described next.

Figure 10:
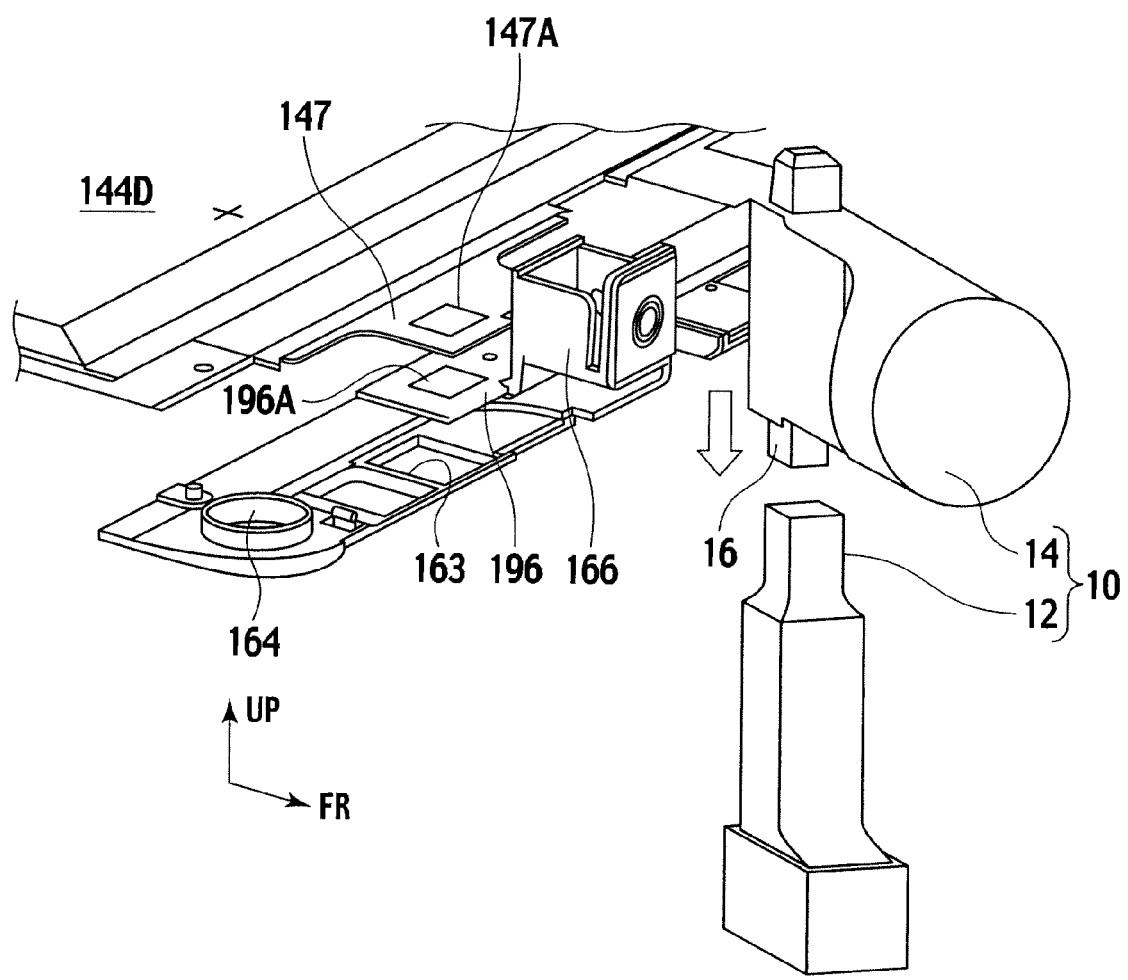
FIG. 10 is a perspective view for explaining a manufacturing method of the battery module according to Embodiment 1 and shows an output terminal forming step.
Figure 11:
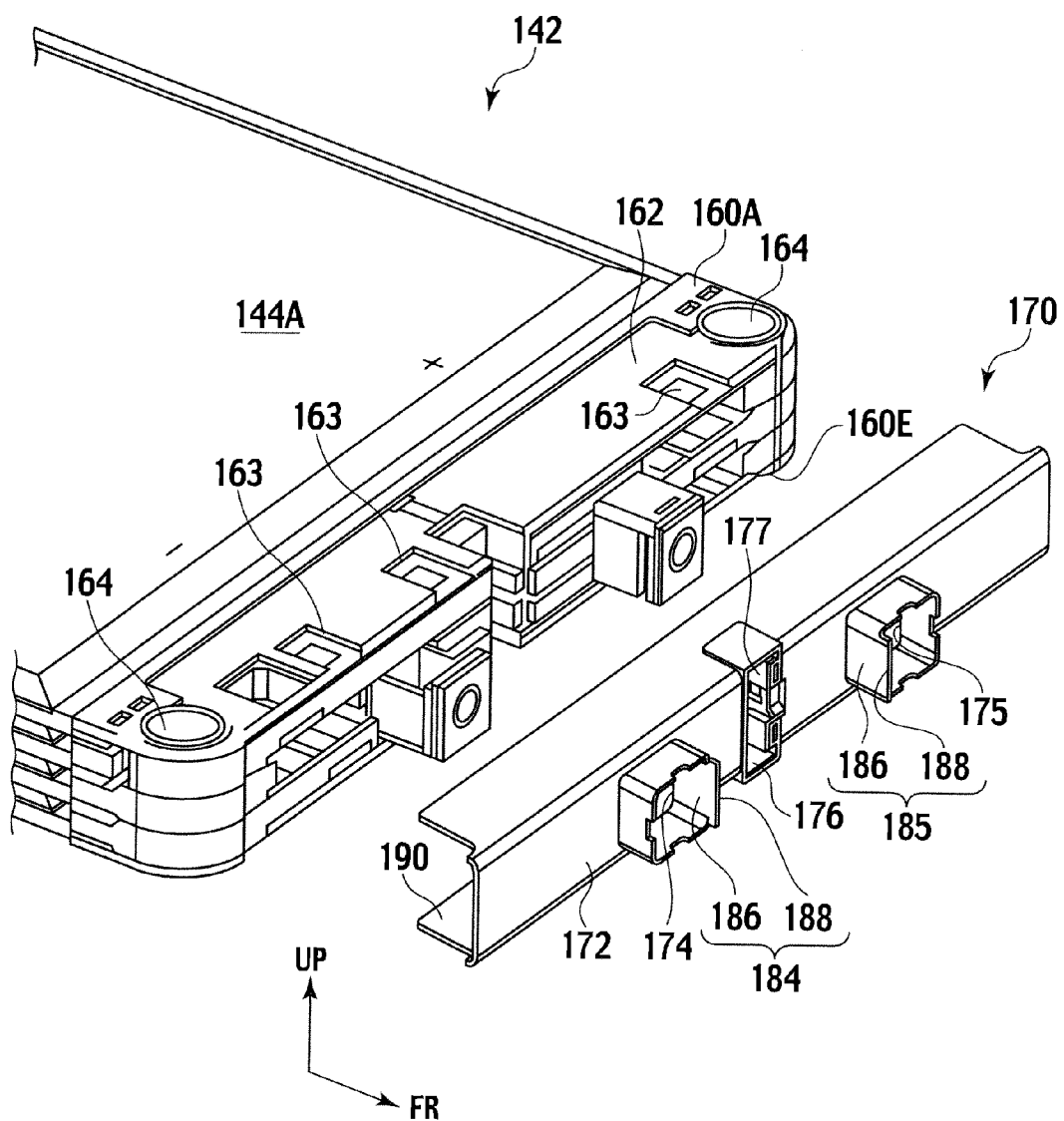
FIG. 11 is a perspective view for explaining an insulating cover attaching step subsequent to FIG. 10.
Figure 12:
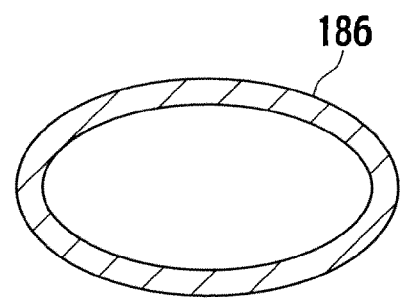
FIG. 12 is a cross-sectional view for explaining Modification 1 according to Embodiment 1, the cross-sectional view corresponding to FIG. 8.
Figure 13:
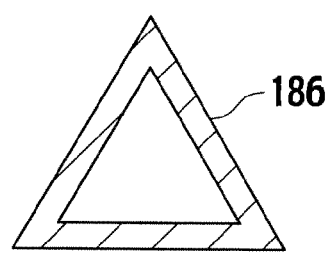
FIG. 13 is a cross-sectional view for explaining Modification 2 according to Embodiment 1, the cross-sectional view corresponding to FIG. 8.
Figure 14:
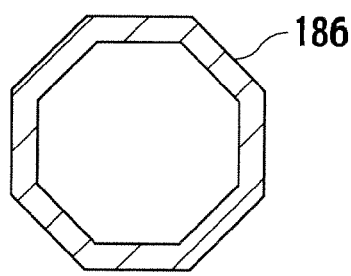
FIG. 14 is a cross-sectional view for explaining Modification 3 according to Embodiment 1, the cross-sectional view corresponding to FIG. 8.
Figure 15:
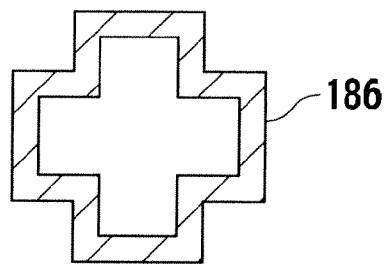
FIG. 15 is a cross-sectional view for explaining Modification 4 according to Embodiment 1, the cross-sectional view corresponding to FIG. 8.
Figure 16:
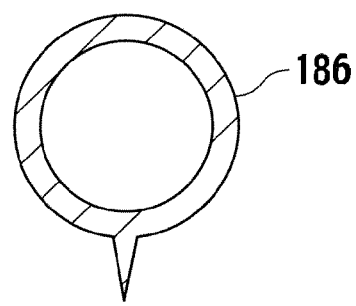
FIG. 16 is a cross-sectional view for explaining Modification 5 according to Embodiment 1, the cross-sectional view corresponding to FIG. 8.

FIG. 10 is a perspective view for explaining an output terminal forming step. FIG. 11 is a perspective view for explaining an insulating cover attaching step subsequent to FIG. 10.

The manufacturing method of the battery module according to Embodiment 1 includes a stacked body forming step, a output terminal forming step, an insulating cover attaching step and a metal container housing step.

Figure 4:
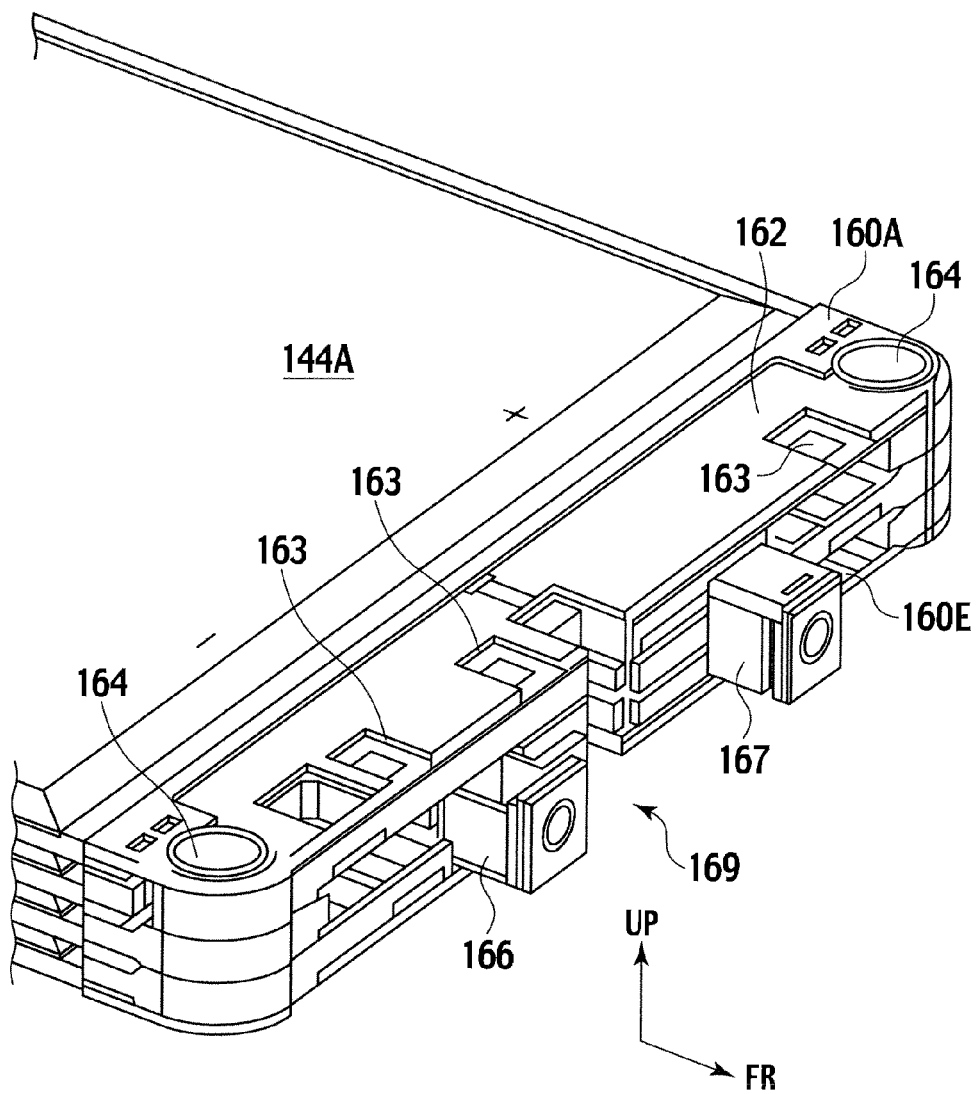
FIG. 4 is a perspective view for explaining a front face side of a stacked body shown in FIG. 2.

In the stacked body forming step, the flat batteries 144A 144D and the spacers 160 and 161 shown in FIGS. 5 and 6 are stacked on one another to form a stacked body shown in FIG. 4.

In the output terminal forming step, the tabs 147 and 148 exposed from the window portions 163 are joined to form the output terminal 166.

For the joining, an ultrasonic joining device 10 shown in FIG. 10 is used, for example. The ultrasonic joining device 10 includes an anvil 12 and a horn part 14. The joining portions 147A and 196A of the tab 147 and the bus bar 196 are laid on top of each other, and set on the anvil 12. The horn part 14 including a chip 16 detachably attached to a lower end portion thereof generates an ultrasonic vibration.

The tab 147 and the bus bar 196 are subjected to the ultrasonic vibration while pressed by the chip 16 on the anvil 12. The ultrasonic vibration joins together the boundary faces of the tab 147 and the bus bar 196 by diffusing atoms of the metals as the materials forming the tab 147 and the bus bar 196, followed further by recrystallization. Note that the joining is not limited to ultrasonic joining, and welding (e.g., contact resistance) or bonding may be used instead.

In the insulating cover attaching step, as shown in FIG. 11, the insulating cover 170 is attached to the stacked body 142 by sandwiching the stacked body 142 with the side face portions 190 to thereby form the cell unit 140 shown in FIG. 2. In this event, the insulating cover 170 is fitted in such a way to cover the window portions 163 of the spacers 160A and 160E located in the outermost layers in the stacking direction.

In the metal container housing step, the cell unit 140 is housed in the case 120 (see FIG. 1). In this event, the cell unit 140 is disposed inside the lower case 122, and the upper case 124 is put on the lower case 122. Then, an edge portion of the upper case 124 is bent around and clamped on to an edge portion of a peripheral wall of the lower case 122 by swaging. As a result, there is manufactured the battery module 100 in which the window portions of the insulating plates located in the outermost layers are covered with the insulating cover.

FIGS. 12 to 17 are cross-sectional views for explaining Modifications 1 to 6 according to Embodiment 1, respectively.

Figure 17:
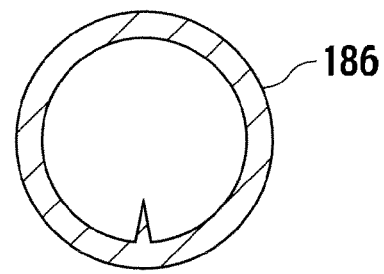
FIG. 17 is a cross-sectional view for explaining Modification 6 according to Embodiment 1, the cross-sectional view corresponding to FIG. 8.

The cross-sectional shapes of the tubular wall portions 186 are not limited to the shapes corresponding to the outer peripheral shapes of the output terminals 166 and 167, but are preferably noncircular shapes so that the tubular wall portions 186 can be used as rotation preventing means. For example, besides the rectangular shapes described above, it is possible to apply: an elliptical shape (FIG. 12); a triangular shape (FIG. 13); an octagonal shape (FIG. 14); a cross shape (FIG. 15); a circular shape with a projecting portion formed on a portion thereof (FIG. 16); or a circular shape with a recessed portion formed in a portion thereof (FIG. 17).

Figure 18:
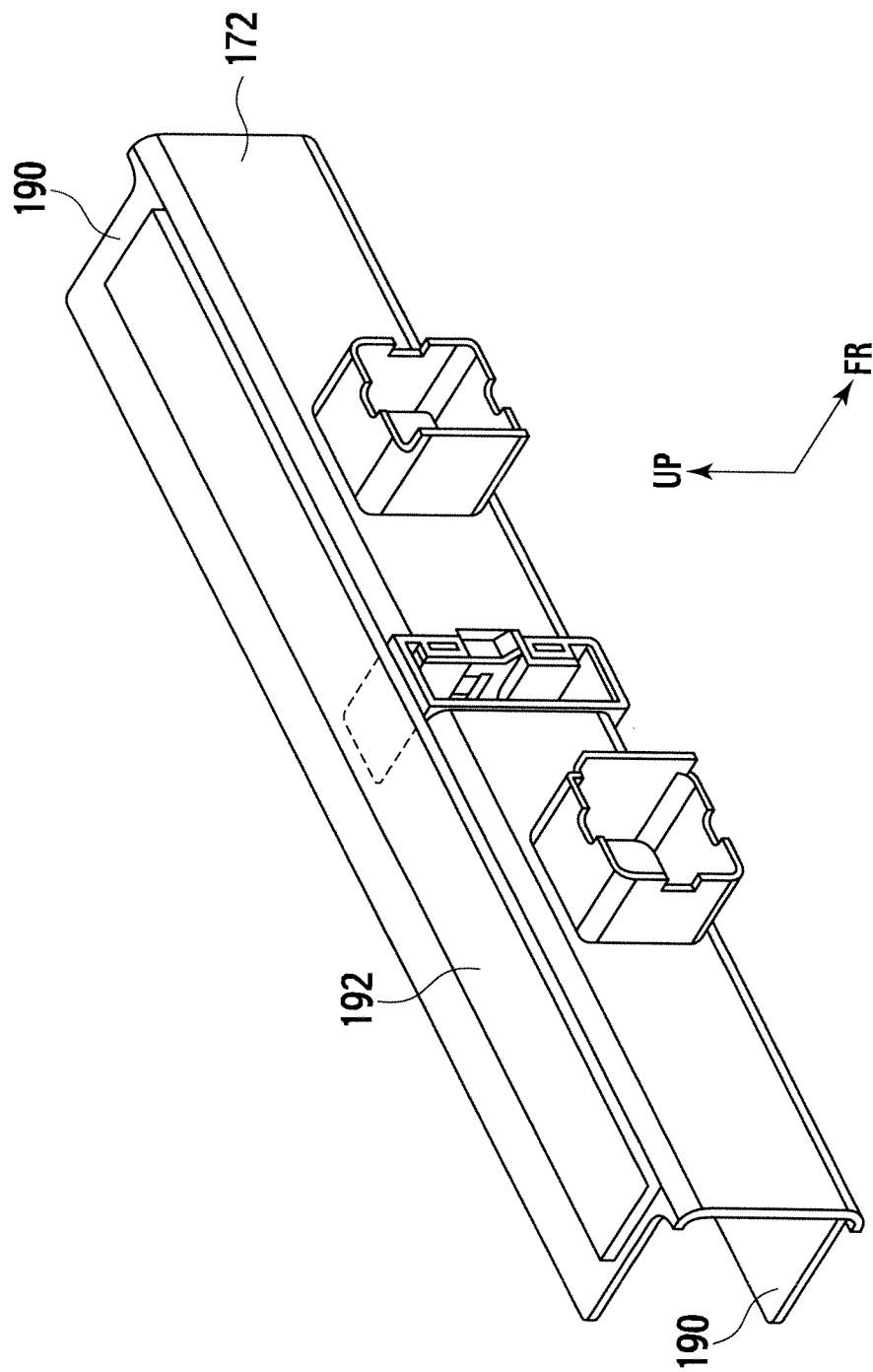
FIG. 18 is a perspective view for explaining Modification 7 according to Embodiment 1.

FIG. 18 is a perspective view for explaining Modification 7 according to Embodiment 1.

A cushion member 192 made, for example, of urethane may be disposed on each side face portion 190 of the insulating cover 170. The cushion member 192 therefore comes to be located between the inner face of the case 120 and the insulating cover 170. Then, when a shock (e.g., vibration) is given to the case 120, the cushion member 192 is capable of reducing the influence of the shock on the cell unit 140 (stacked body 142) sandwiched by the side face portions 190, and enhancing the durability of the battery module 100. The cushion member 192 may be disposed on only one of the side face portions 190 of the insulating cover 170.

As described above, in the battery module according to Embodiment 1, the window portions of the spacers located uppermost and lowermost are covered with the insulating cover. In other words, the insulating cover is interposed between the tabs exposed from the window portions and the inner face of the case, whereby short circuits between the tabs and the case are prevented. Thus, the insulation properties of the inner face of the case need not be increased, and an increase in manufacturing cost is therefore suppressed. This makes it possible to provide a battery module capable of preventing short circuits between its tabs and case while suppressing an increase in manufacturing cost.

With the manufacturing method according to Embodiment 1, it is possible to manufacture the battery module in which the window portions of the insulating plates located in the outermost layers are covered with the insulating cover. That is, it is possible to provide a manufacturing method of a battery module capable of preventing short circuits between its electrode terminals and metal container while suppressing an increase in manufacturing cost.

In addition, since the output terminals are held by the respective tubular wall portions, it is possible to reduce loads on the joining portions of the output terminals and the spacers when an external force is applied to the output terminals. The tubular wall portions here are preferable for their capabilities of holding the output terminals with simple structures. Since the tubular wall portions include the extended portions extending beyond the lead ends of the output terminals, contact of the output terminals with an electrical conductor present outside is inhibited, whereby occurrence of the short circuits can be further suppressed. The cross-sectional shapes of the tubular wall portions are substantially rectangular shapes (noncircular shapes), and the tubular wall portions can therefore be used as rotation preventing means at the time of bolting the output terminals. This relaxes stresses applied to the output terminals, making it possible to reduce loads on the joining portions of the output terminals and the spacers.

Moreover, since the tubular wall portions are integral with the insulating cover, the number of components is reduced, whereby the manufacturing cost can be reduced. Furthermore, the insulating cover includes the insertion opening for the voltage detecting connector for the flat batteries. In an edge portion of the insertion opening, the connector guide is disposed to guide insertion and removal of the connector. The insulating cover and the connector guide are integral with each other. For this reason, the number of components is reduced, whereby the manufacturing cost can be reduced.

Meanwhile, with the absorbers being disposed between the inner face of the case and the insulating cover, when a shock (e.g., vibration) is given to the case, the stacked body is influenced by such shock to a lesser extent than otherwise. Hence, the durability of the battery module can be improved.

Embodiment 2 will be described next.

Figure 19:
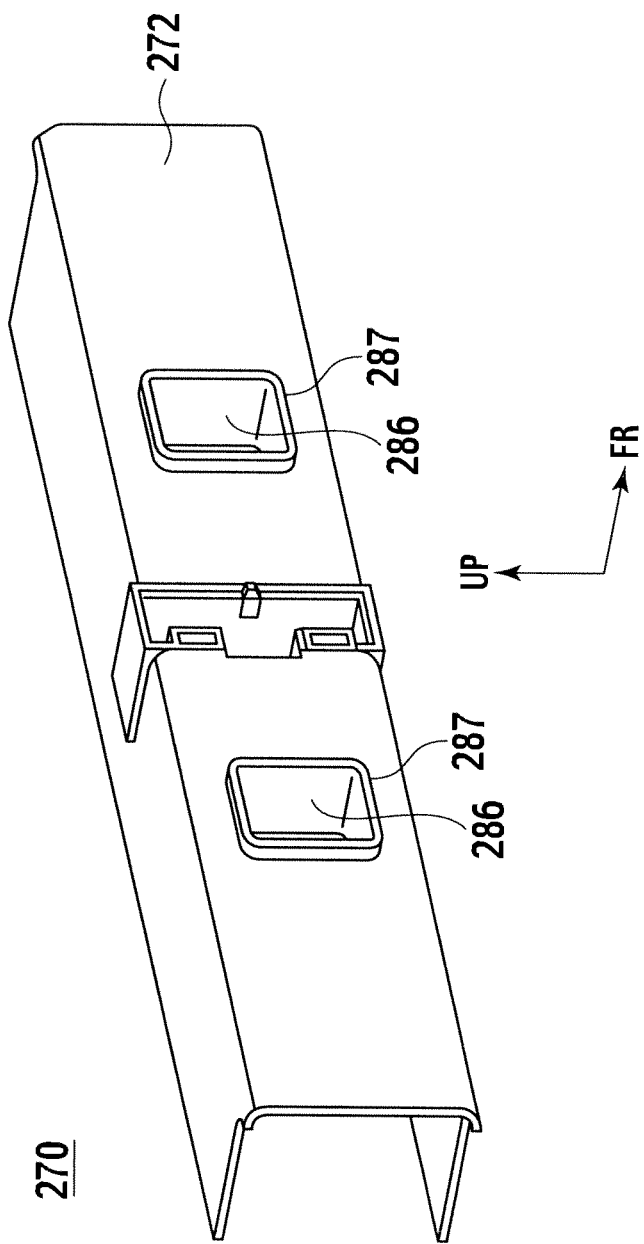
FIG. 19 is a perspective view for explaining an insulating cover of a battery module according to Embodiment 2.
Figure 20:
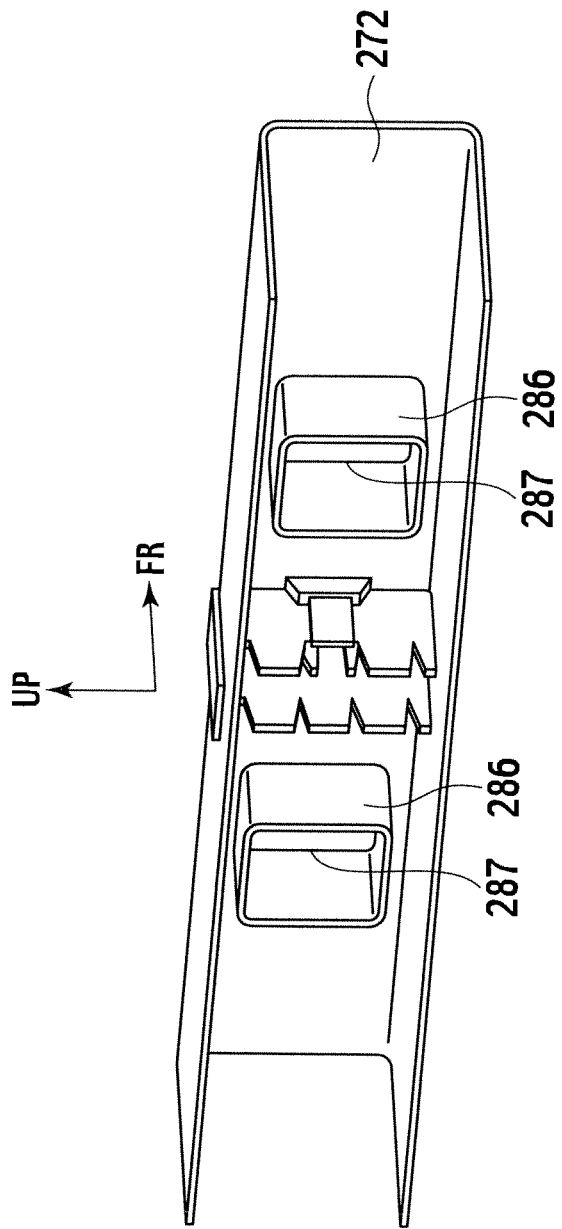
FIG. 20 is a perspective view for explaining the back shape of the insulating cover shown in FIG. 19.
Figure 21:
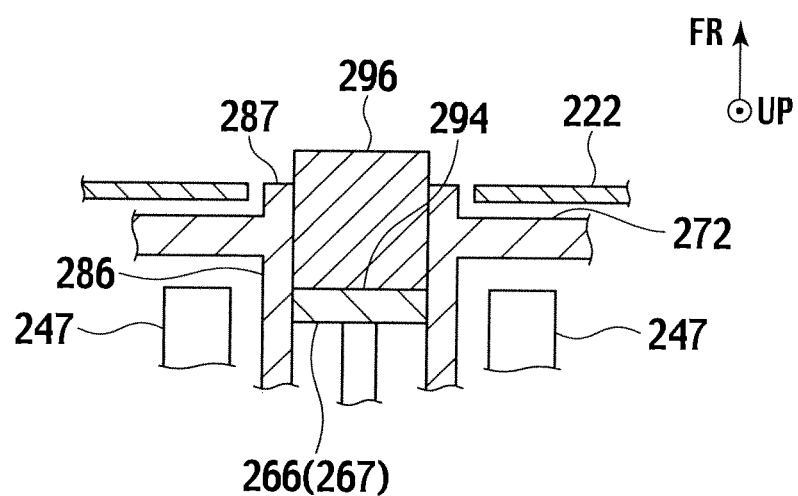
FIG. 21 is a cross-sectional view for explaining the insulating cover shown in FIG. 19.

FIG. 19 is a perspective view for explaining a battery module according to Embodiment 2. FIG. 20 is a perspective view for explaining the back shape of an insulating cover shown in FIG. 19. FIG. 21 is a cross-sectional view for explaining the insulating cover shown in FIG. 19. Note that in the following, similar reference numerals are used for components having the same functions as those in Embodiment 1, and the description thereof will be omitted to avoid redundancy.

Embodiment 2 differs from Embodiment 1 mainly in the configurations of the tubular wall portions (terminal guides). An insulating cover 270 according to Embodiment 2 includes a main-body base portion 272 in which tubular wall portions 286 are disposed. The tubular wall portions 286 extend toward the cell unit (stacked body) from the main-body base portion 272.

A base portion 287 of each tubular wall portion 286 is located outside the lead end of a corresponding output terminal 266 (267). The lead end of the output terminal 266 (267) and the base portion 287 of the tubular wall portion 286 form a recessed portion 294. The recessed portion 294 is used as a portion to which to dispose an external bus bar 296.

Thus, in Embodiment 2, the external bus bar can be positioned easily. Moreover, the tubular wall portion 286 makes it possible to integrally form the rotation preventing means for the output terminal with that for the external bus bar. Incidentally, the lead end of the output terminal can be located outside the base portion of the tubular wall portion. In this case, the projecting length of the output terminal from the insulating cover decreases, hence making it possible to suppress occurrence of interference between the output terminal and a component present outside. Here, reference numeral 222 and reference numerals 247 denote the lower case and the tabs, respectively.

Embodiment 3 will be described next.

Figure 22:
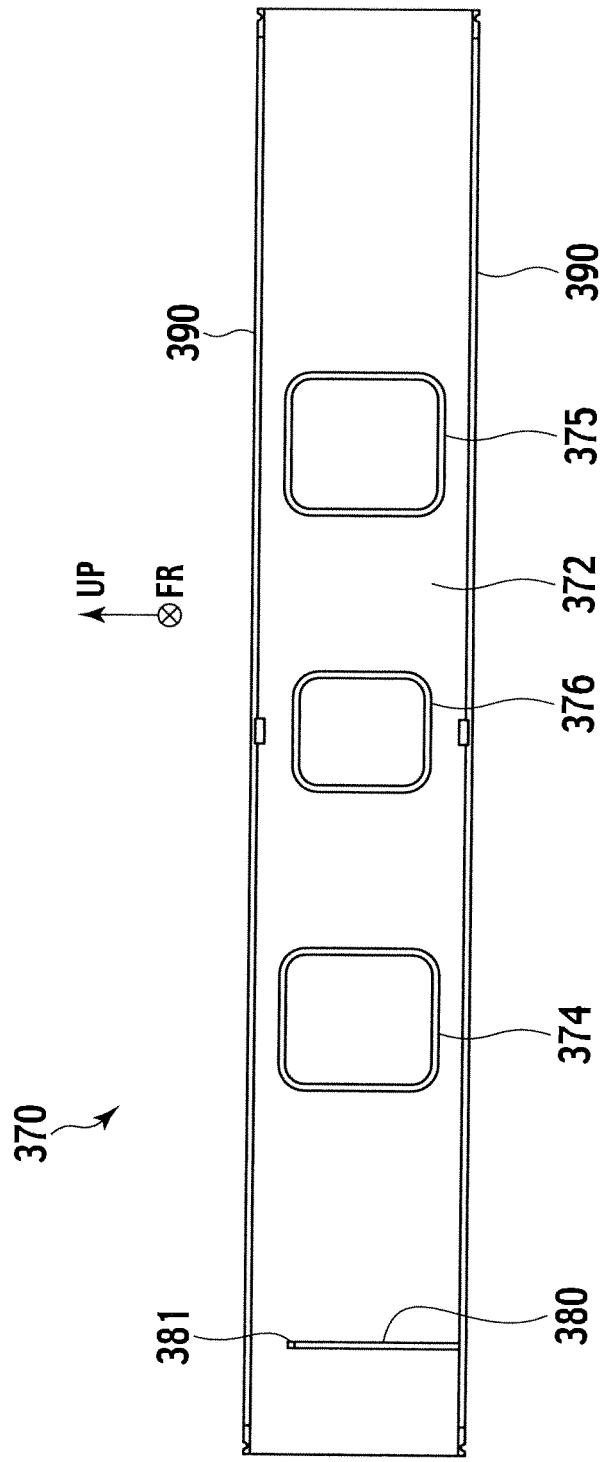
FIG. 22 is a back view for explaining an insulating cover of a battery module according to Embodiment 3.
Figure 23:
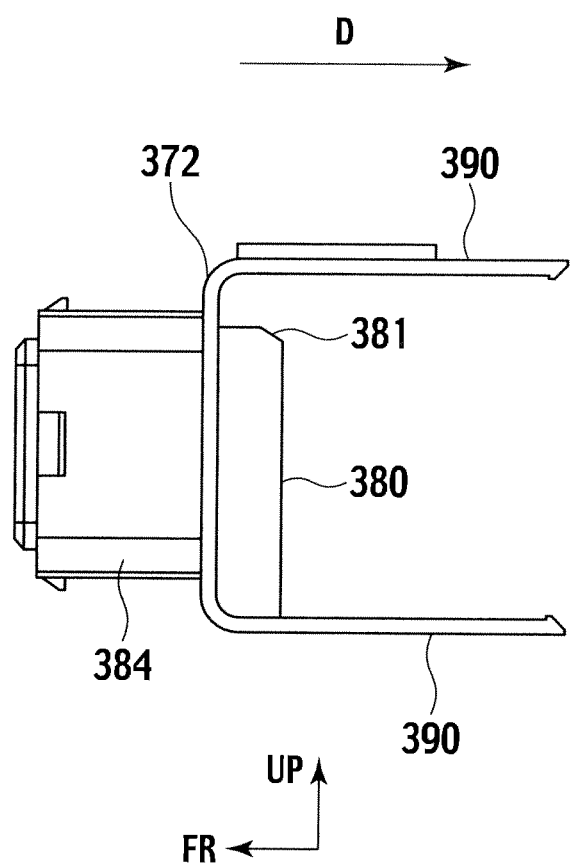
FIG. 23 is a side view for explaining the insulating cover of the battery module according to Embodiment 3.
Figure 24:
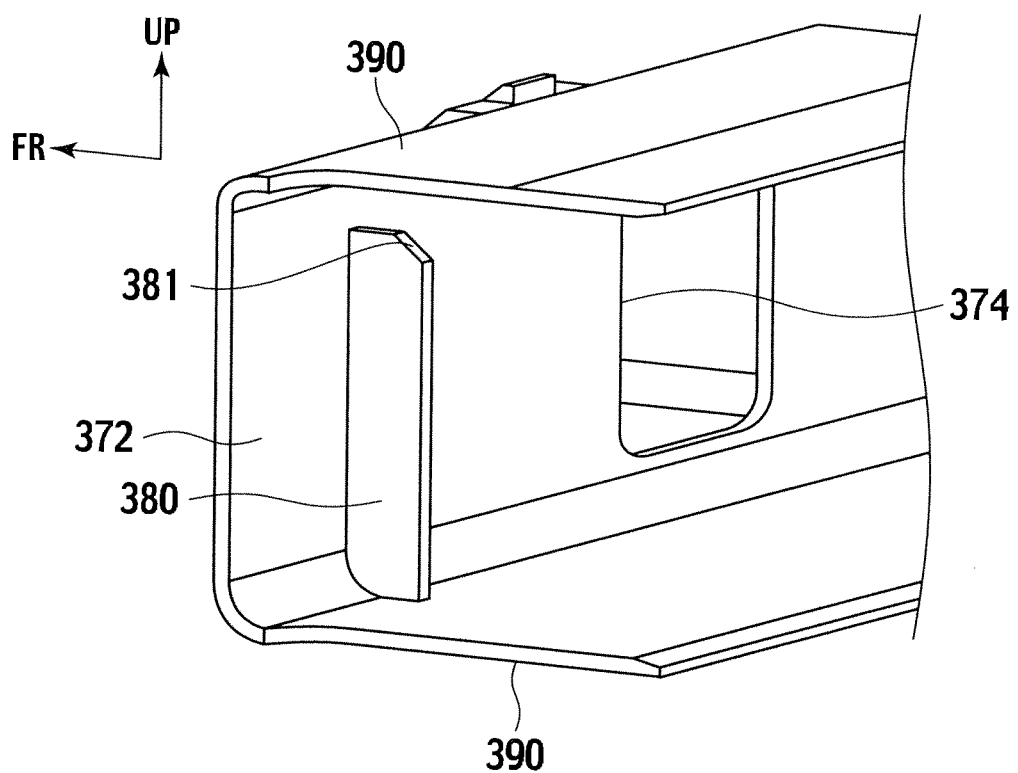
FIG. 24 is a perspective view for explaining the insulating cover of the battery module according to Embodiment 3.
Figure 25:
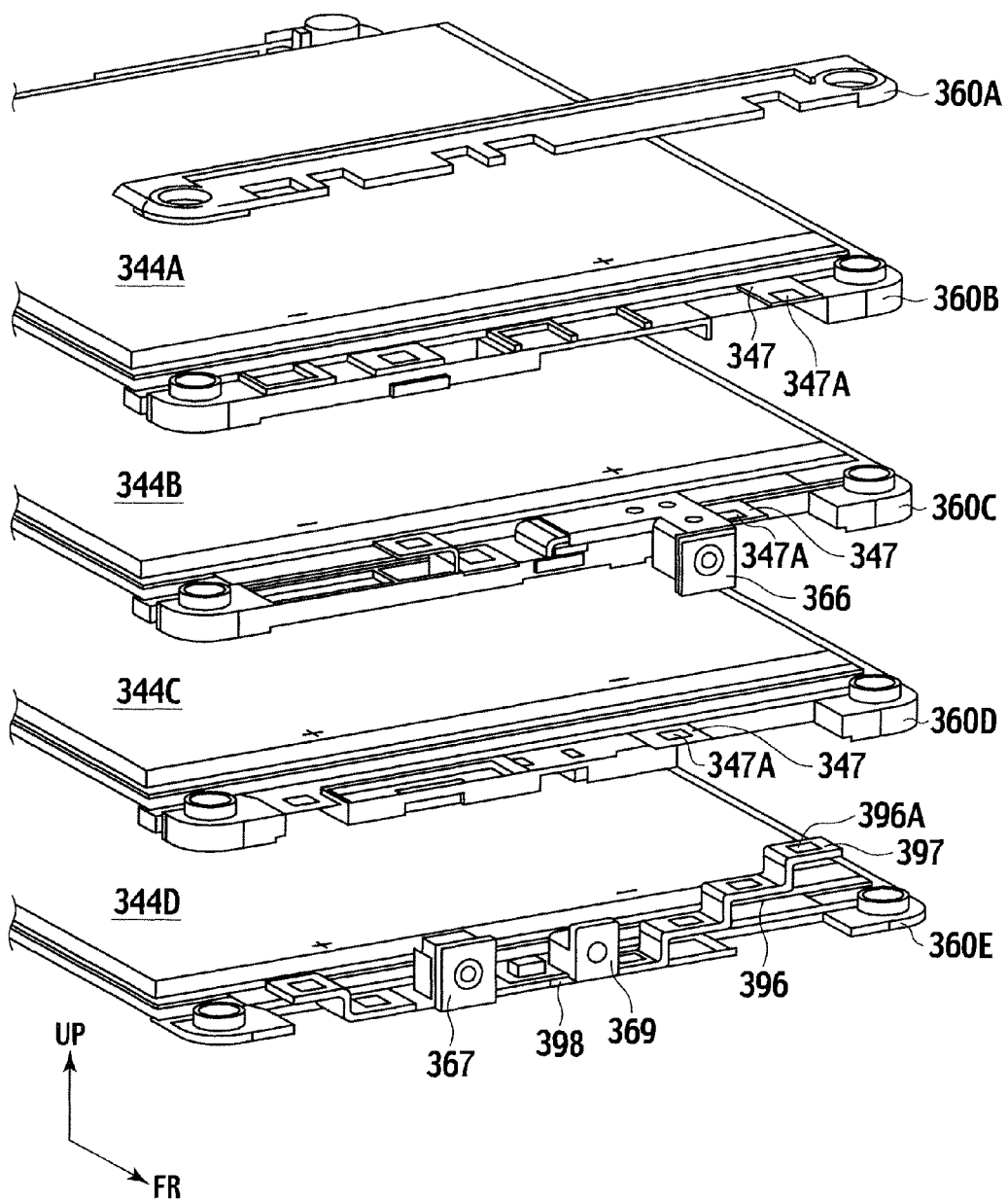
FIG. 25 is a perspective view for explaining a bus bar of the battery module according to Embodiment 3.

FIGS. 22, 23 and 24 are a back view, a side view and a perspective view for explaining an insulating cover of a battery module according to Embodiment 3. FIG. 25 is a perspective view for explaining a bus bar of the battery module according to Embodiment 3.

Embodiment 3 differs from Embodiment 1 in the configuration of the bus bar as well as the support structure therefor. An insulating cover 370 according to Embodiment 3 includes a main-body base portion 372 located on the front face side of the battery module 100, and side face portions 390 extending almost orthogonally respectively from both upper and lower edges of the main-body base portion 372 toward the rear side of the battery module 100. A rib (contact portion) 380 and opening portions 374 to 376 are disposed on and in the main-body base portion 372.

The rib 380 is in contact with a bus bar 396. The bus bar 396 is a connecting portion to output terminals 366 and 367 for tabs (electrode terminals) 347 of flat batteries 344A to 344D. The bus bar 396 has a stepped shape, includes a fixed end 398 fixed to (held by) a spacer 360E and a free end 397 to be brought into contact with the rib 380, and thus is supported in cantilever fashion. In other words, the tabs 347 of the flat batteries 344A to 344D are joined to one another through the bus bar 396.

When a vibration is inputted, such vibration is suppressed since the free end 397 of the bus bar 396 is in contact with the rib 380, whereby occurrence for example of the cracking of the tabs 347 is eliminated reliably. Also, since the rib 380 is not disposed on the spacers 360A to 360E, no interference is induced between the rib 380 and a joining device for joining the tabs 347 to the bus bar 396 in formation of the output terminals 366 and 367 by joining the tabs together in the stacking direction.

In particular, in the case of the battery module according to Embodiment 3, a configuration with a larger height is needed for the bus bar, and the length from the fixed end to the free end of the bus bar is larger. This causes the bus bar to vibrate greater, and makes the cracking of the tabs more likely to occur. For this reason, the vibration suppressing effect by disposition of the rib 380 is particularly remarkable. In addition, the rib 380 is preferable for its simple structure allowing a cost reduction and space saving. Note that the structure to fix the bus bar 396 to the spacer 360E is not particularly limited.

Meanwhile, the direction in which the rib 380 is brought into contact with the bus bar 396 (the direction in which the rib 380 is held) is identical to the stacking direction. Thus, the vibration can be suppressed reliably and also efficiently.

Moreover, the rib 380 projects in a direction D in which the insulating cover 370 is fitted, and one side thereof is joined to one of the side face portion 390. In addition, the other side of the rib 380 which is not joined to the one side face portion 390 has a corner 381 at its leading end. Being chamfered or rounded, the corner 381 is smooth, facilitating its insertion.

Hence, when the insulating cover 370 is to be fitted and disposed to cover the window portions of the spacers 360E and 360A located in the outermost layers, the insertion is performed smoothly while preventing the rib 380 from interfering with (e.g., being hooked on) the bus bar 396. This makes it possible to prevent product failures, and also improve the product quality.

Note that reference numeral 384 shown in FIG. 23 denotes a projecting portion including a tubular wall portion terminal (guide) and an extended portion. Reference numerals 347A and reference numeral 396A shown in FIG. 25 denote joining portions of the tabs 347 and bus bar 396, respectively.

A manufacturing method of the battery module according to Embodiment 3 will be described next.

Figure 26:
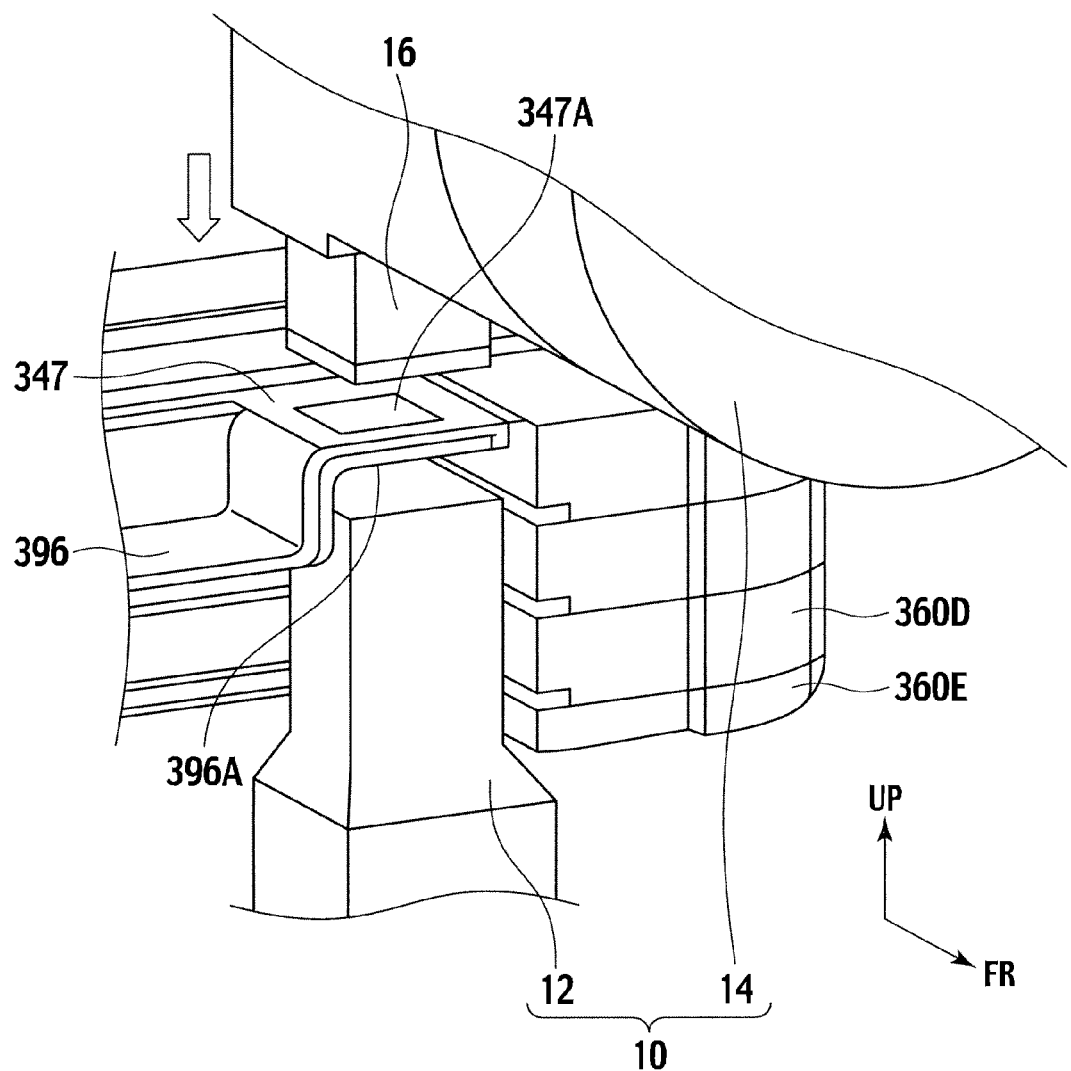
FIG. 26 is a perspective view for explaining a manufacturing method of the battery module according to Embodiment 3 and shows an output terminal forming step.
Figure 27:
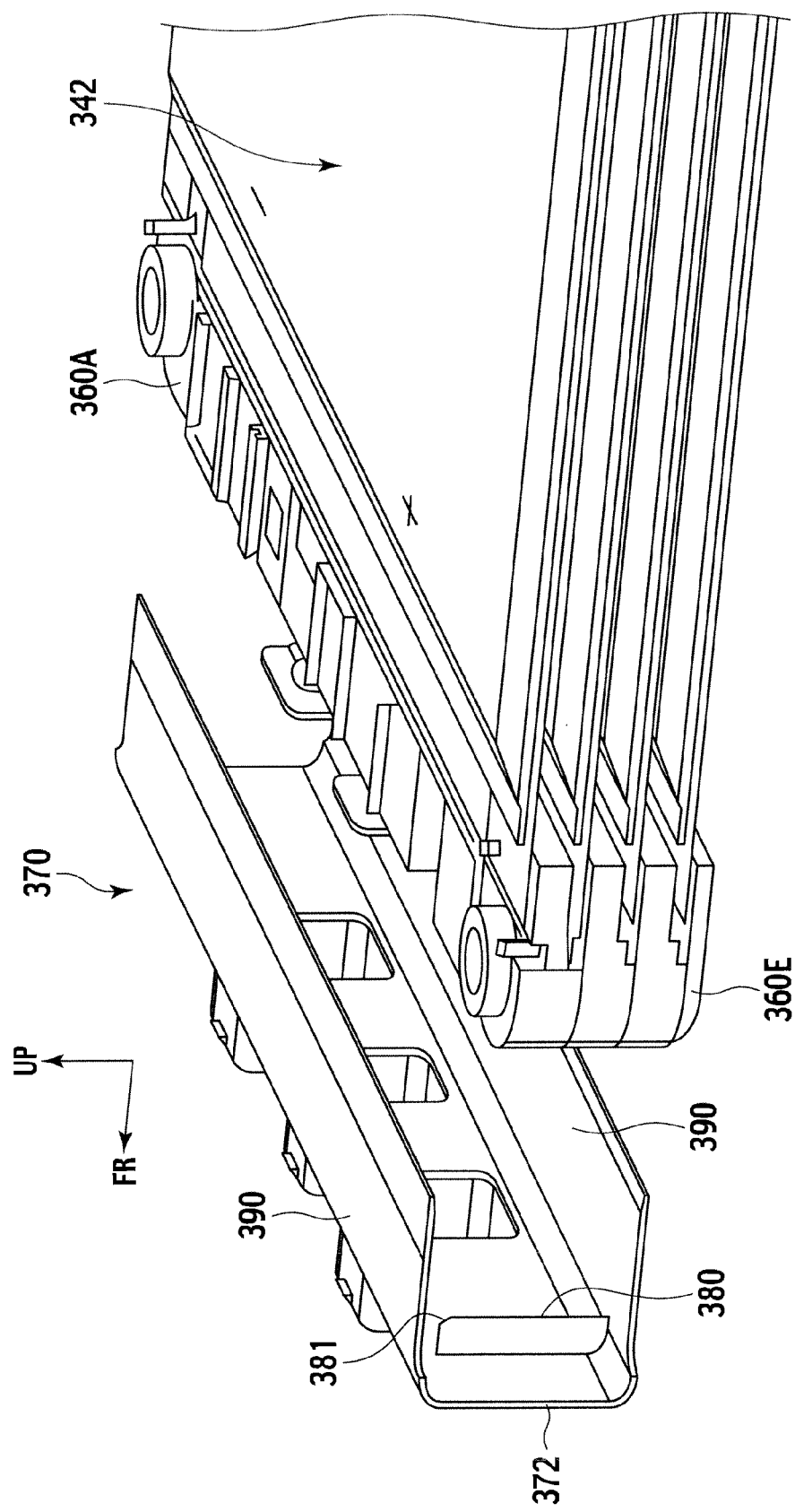
FIG. 27 is a perspective view for explaining an insulating cover attaching step subsequent to FIG. 26.
Figure 28:
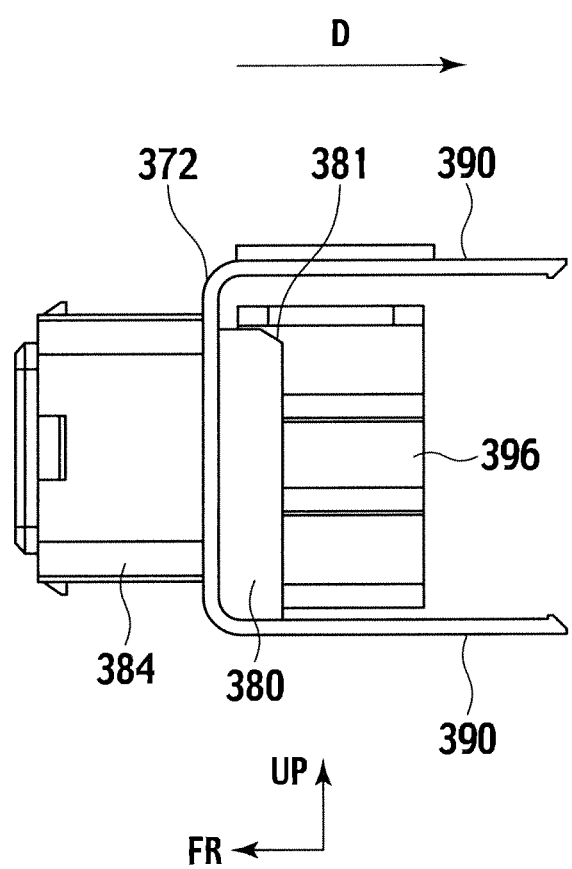
FIG. 28 is a side view for explaining the fitting of the insulating cover.
Figure 29:
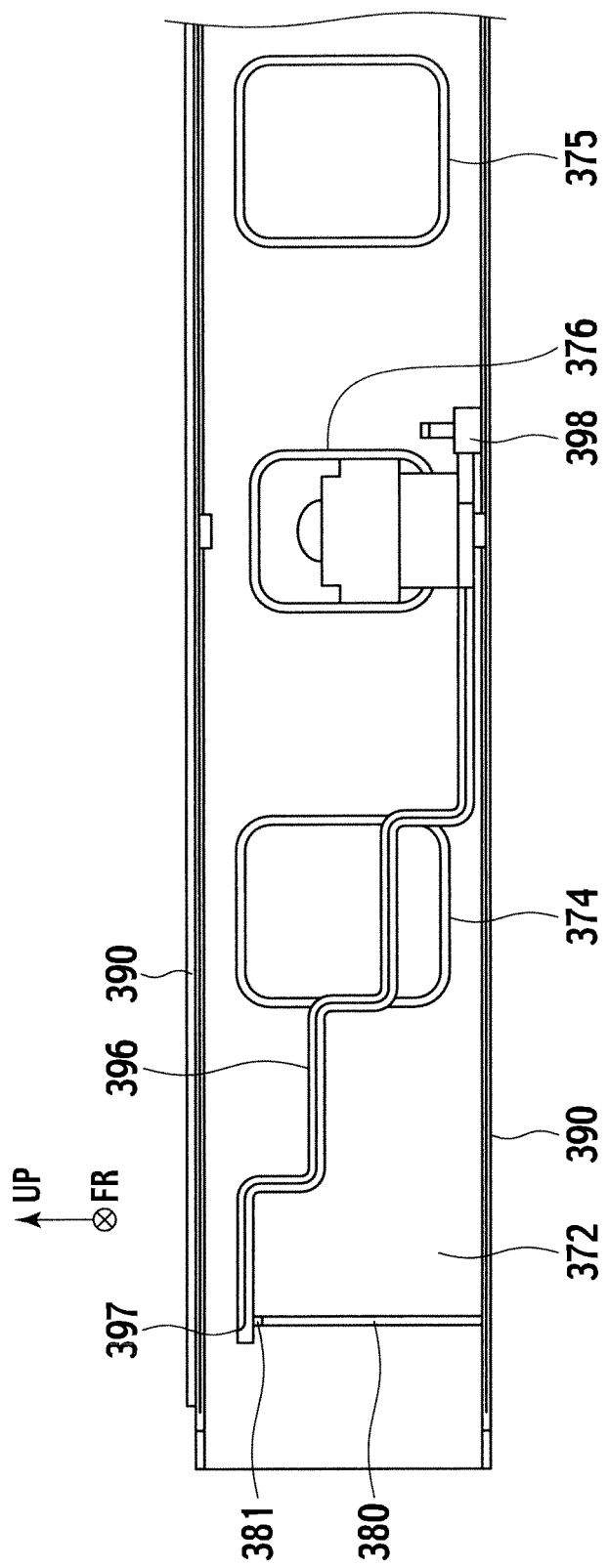
FIG. 29 is a back view for explaining a support structure of the bus bar.
Figure 30:
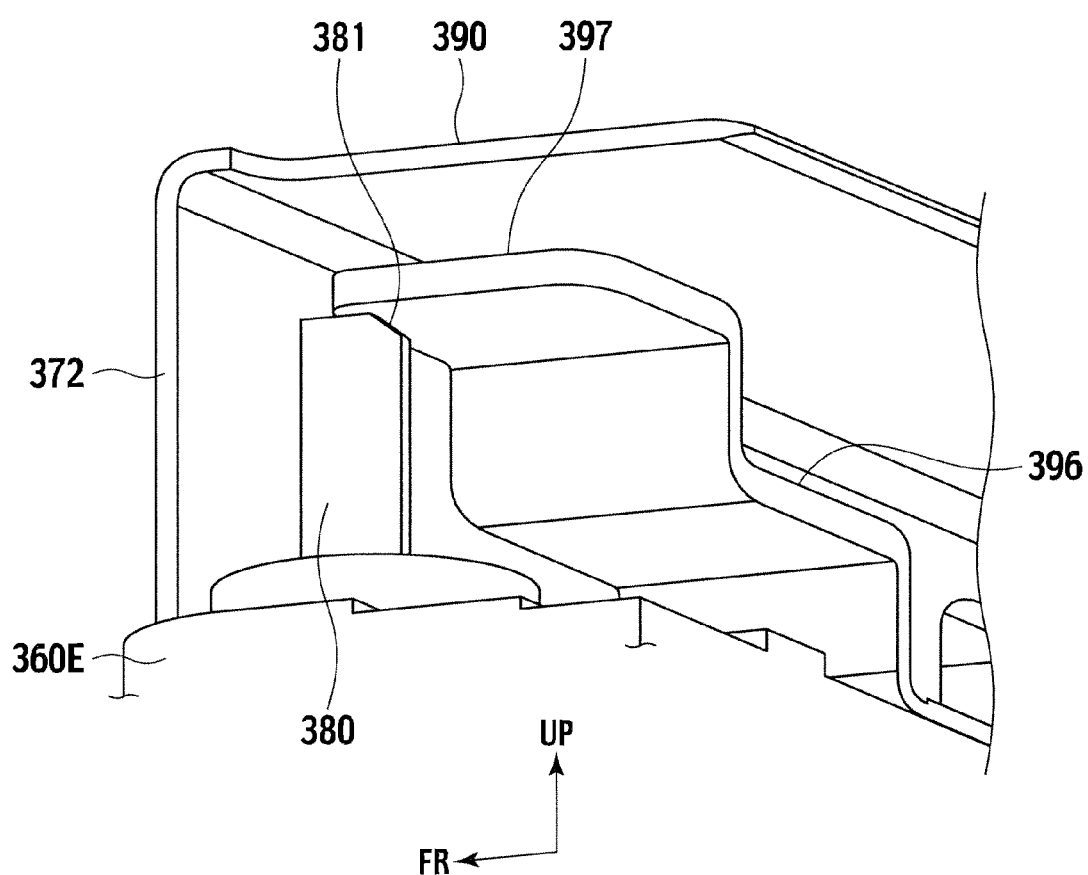
FIG. 30 is a perspective view for explaining the support structure of the bus bar.

FIG. 26 is a perspective view for explaining an output terminal forming step. FIG. 27 is a perspective view for explaining an insulating cover attaching step subsequent to the step shown in FIG. 26. FIG. 28 is a side view for explaining the fitting of the insulating cover. FIGS. 29 and 30 are a back view and a perspective view for explaining a support structure of the bus bar.

Embodiment 3 differs from Embodiment 1 mainly in the output terminal forming step and the insulating cover attaching step.

First, in a stacked body forming step, the flat batteries 344A to 344D and the spacers 360 are stacked on one another to form a stacked body 342.

In the output terminal forming step, the tabs 347 exposed through the window portions of the flat batteries 344A to 344D constituting the stacked body 342 are joined together in the stacking direction by using the ultrasonic joining device 10, to thereby form the output terminals 366 and 367.

In this event, as shown in FIG. 26, the joining portions 347A and 396A of the tab 347 and the bus bar 396 are laid on top of each other and set on the anvil 12 of the ultrasonic joining device 10. Then, the horn part 14 of the ultrasonic joining device 10 is lowered, and the chip 16 disposed in a lower portion of the horn part 14 presses the joining portions 347A and 396A of the tab 347 and the bus bar 396.

In this pressed state, the horn part 14 subjects the joining portions 347A and 396A to an ultrasonic vibration to join together the boundary faces of the tab 347 and the bus bar 396. In the output terminal forming step, the insulating cover 370 is not yet attached, and hence no interference is induced between the rib 380 of the insulating cover 370 and the ultrasonic joining device 10. Fine workability is therefore provided.

In the insulating cover attaching step, as shown in FIG. 27, the insulating cover 370 is attached to the stacked body 342 in such away to sandwich the stacked body 342 with the side face portions 390 thereof, to thereby form a cell unit. In this event, the insulating cover is fitted in such a way to cover the window portions of the spacers 360A and 360E located in the outermost layers in the stacking direction.

Meanwhile, the rib 380 of the insulating cover 370 projects in the direction D in which the insulting cover 370 is fitted. Being chamfered or rounded, the corner 381 at the leading end is smooth. Accordingly, as shown in FIG. 28, when the insulating cover 370 is to be fitted, the insertion is performed smoothly while preventing of the rib 380 from interfering with (e.g., being hooked on) the bus bar 396. This makes it possible to prevent product failures, and also improve the product quality.

In a metal container housing step, the cell unit is housed in the case, whereby there is manufactured a battery module in which the window portions of the insulating plates located in the outermost layers are covered with the insulating cover. As shown in FIGS. 29 and 30, the rib 380 of the insulating cover 370 is in contact with the free end 397 of the bus bar 396 supported in cantilever fashion by the fixed end 398. Thus, when a vibration is inputted, such vibration is suppressed. Also, since the direction in which the rib 380 is brought into contact with the bus bar 396 is identical to the stacking direction, the vibration can be suppressed reliably and also efficiently.

As described above, in the battery module according to Embodiment 3, the insulating cover includes the rib to be brought into contact with the free end of the bus bar. Accordingly, when a vibration is inputted, such vibration is suppressed due to the contact between the bus bar and the rib. In addition, since the rib is not disposed on the spacers, no interference is induced between the rib and the joining device for joining the tab to the bus bar.

Moreover, the direction in which the rib is brought into contact with the bus bar is identical to the stacking direction. Accordingly, the vibration can be suppressed reliably and also efficiently.

Being chamfered or rounded, the corner of the rib is smooth, facilitating its insertion. Hence, when the insulating cover is to be fitted and disposed to cover the window portions of the spacers located in the outermost layers, the insertion is performed smoothly while preventing the rib from interfering with (e.g., being hooked on) the bus bar. This makes it possible to prevent product failures and also improve the product quality.

In the output terminal forming step in the manufacturing method according to Embodiment 3, the insulating cover is not yet attached, and hence no interference is induced between the rib of the insulating cover and the ultrasonic joining device. Fine workability is therefore provided. Moreover, in the insulating cover attaching step, when the insulating cover is to be fitted, the presence of the chamfered or rounded corner prevents the rib from interfering with (e.g., being hooked on) the bus bar, allowing smooth insertion. This makes it possible to prevent product failures and also improve the product quality.

Note that the rib of the insulating cover is not limited to the instance of being in contact with the bus bar's free end itself. The rib can be configured such that it may be brought into contact with a portion of the bus bar located between the free end and the fixed end.

In addition, the connecting portion to the output terminals for the tabs of the flat batteries is not limited to the stepped bus bar having the fixed end fixed to the spacer. Any connecting portion is applicable as long as it is configured such that it is supported in cantilever fashion and includes a free end which vibrates.

Furthermore, the connecting portion is not limited to the instance where it is formed by the bus bar. For example, the rib according to Embodiment 3 is applicable to Embodiment 1. Then, Embodiment 1 would be such that: the tabs of the flat batteries are directly joined together; connecting portions to the output terminals for the electrode terminals of the flat batteries are tabs supported in cantilever fashion by the flat batteries; and the rib of the insulating cover is set to come in contact with the tab.

The embodiments explained hereinabove are only examples described for the purpose of facilitating the understanding of the present invention. The present invention is not limited to those embodiments. Each element disclosed in the above-described embodiments, any combination of the above-described embodiments, modifications and changes belonging to the technical scope of the present invention, such for example as one obtained by applying any of Modifications 1 to 7 according to Embodiment 1 to the battery module according to Embodiment 2 or 3, are all within the scope of the present invention.

This application is based upon and claims the benefit of priority from the prior Japanese Patent Application No. 2008-049930 filed on Feb. 29, 2008 and Japanese Patent Application No. 2008-322830 filed on Dec. 18, 2008, and the entire contents of these applications are incorporated herein by reference.

INDUSTRIAL APPLICABILITY

According to the battery module of the present invention, window portions of insulating plates located in the outermost layers are covered with an insulating cover. Thus, the insulating cover comes to be interposed between the electrode terminals exposed from the window portions and the inner face of a metal container, hence preventing short circuits between the electrode terminals and the metal container. In addition, the insulation properties of the inner face of the metal container need not be increased, and an increase in manufacturing cost is therefore suppressed. Accordingly, the battery module of the present invention is industrially applicable.

According to the manufacturing method of the battery module of the present invention, it is possible to manufacture the battery module in which the window portions of the insulating plates located in the outermost layers are covered with the insulating cover. That is, it is possible to manufacture a battery module capable of preventing short circuits between its electrode terminals and metal container while suppressing an increase in manufacturing cost. Accordingly, the manufacturing method of the battery module of the present invention is industrially applicable.

The invention claimed is:

1. A battery module comprising:
   a cell unit comprising:
      a stacked body of a plurality of flat batteries stacked on one another, each of the flat batteries including a power-generating element, an exterior package member for sealing the power-generating element, and electrode terminals led out from the exterior package member;
      an output terminal which provides a parallel or series connection between the electrode terminals of the plurality of flat batteries and outputs power therefrom; and
      insulating plates which are disposed to hold the electrode terminals of each of the flat batteries therebetween in such a way to insulate the electrode terminals from one another; and
      an insulating cover which is mounted to the cell unit and which includes a terminal guide for holding the output terminal, wherein the insulating cover is fixed to the insulating plates, and includes an upper side face portion and a lower side face portion arranged to sandwich the insulating plates in the flat batteries stacked direction, and
   wherein the terminal guide includes a wall portion having an upper side wall portion and a lower side wall portion arranged to sandwich the output terminal.

2. The battery module according to claim 1, further comprising a metal container which houses the cell unit with the insulating cover mounted thereto.

3. The battery module according to claim 1, wherein the insulating plates include window portions through which the electrode terminals are exposed for the connection, and the insulating cover is disposed in such a way to cover the window portions of the insulating plates located respectively in outermost layers.

4. The battery module according to claim 1, wherein the wall portion having a cross-section shape corresponding to an outer peripheral shape of the output terminal surrounding a periphery of the output terminal.

5. The battery module according to claim 4, wherein the tubular wall portion includes an extended portion extending beyond a lead end of the output terminal.

6. The battery module according to claim 2, further comprising a cushion member disposed between an inner face of the metal container and the insulating cover.

7. The battery module according to claim 4, wherein a cross-sectional shape of the tubular wall portion is a noncircular shape.

8. The battery module according to claim 6, wherein:
the insulating cover includes an opening portion into which to insert a connector for detecting voltages of the flat batteries;
a connector guide for guiding insertion and removal of the connector is disposed in an edge portion of the opening portion; and
the insulating cover and the connector guide are integral with each other.

9. The battery module according to claim 4, wherein the tubular wall portion extends toward the stacked body.

10. The battery module according to claim 9, wherein:
a base portion of the tubular wall portion is located outside a lead end of the output terminal; and
an external bus bar is disposed in a recessed portion formed by the lead end of the output terminal and the base portion of the tubular wall portion.

11. The battery module according to claim 4, wherein the tubular all portion is disposed in such a way to face the front face side of the cell unit.

12. The battery module according to claim 6, wherein the insulating cover includes a contact portion in contact with a connecting portion to the output terminal for the electrode terminals of the flat batteries.

13. The battery module according to claim 12, wherein a direction in which the contact portion is in contact is identical to a direction of the stacking.

14. The battery module according to claim 12, wherein:
the contact portion projects in a direction in which the insulating cover is fitted; and
a corner of the contact portion at a leading end thereof is chamfered or rounded.

* * * * *